(12) United States Patent
Guabtni et al.

(10) Patent No.: US 12,362,947 B2
(45) Date of Patent: Jul. 15, 2025

(54) CRYPTOGRAPHIC SERVICES FOR BROWSER APPLICATIONS

(71) Applicant: Commonwealth Scientific and Industrial Research Organisation, Acton (AU)

(72) Inventors: Adnene Guabtni, Acton (AU); Hugo O'Connor, Acton (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 269 days.

(21) Appl. No.: 17/762,162

(22) PCT Filed: Sep. 25, 2020

(86) PCT No.: PCT/AU2020/051020
§ 371 (c)(1),
(2) Date: Mar. 21, 2022

(87) PCT Pub. No.: WO2021/056069
PCT Pub. Date: Apr. 1, 2021

(65) Prior Publication Data
US 2022/0376933 A1    Nov. 24, 2022

(30) Foreign Application Priority Data
Sep. 25, 2019   (AU) ................................ 2019903591

(51) Int. Cl.
*H04L 9/32*      (2006.01)
*G06F 21/64*     (2013.01)
(Continued)

(52) U.S. Cl.
CPC ............ *H04L 9/3271* (2013.01); *G06F 21/64* (2013.01); *H04L 9/0894* (2013.01);
(Continued)

(58) Field of Classification Search
None
See application file for complete search history.

(56) References Cited

U.S. PATENT DOCUMENTS 5,134,700 A * 7/1992 Eyer ....................... G06F 21/74
711/E12.1
5,481,610 A * 1/1996 Doiron .................. H04L 9/0894
380/46
(Continued)

FOREIGN PATENT DOCUMENTS

CN       108768938 A  * 11/2018  ......... H04L 63/0428
EP        2456158 A1  *  5/2012  ............. G06F 21/33
(Continued)

OTHER PUBLICATIONS

Ingle et al "A Review on Secure Communication Protocol for Wireless Ad Hoc Network," 2015 International Conference on Pervasive Computing (ICPC), IEEE, pp. 1-4 (Year: 2015).*
(Continued)

*Primary Examiner* — Luu T Pham
*Assistant Examiner* — James J Wilcox
(74) *Attorney, Agent, or Firm* — Crowell & Moring LLP

(57) ABSTRACT

This disclosure relates to the provision of cryptographic services to web browsers, and more specifically, to systems and methods for providing cryptographic results to a browser from a cryptographic device over a persistent peer-to-peer connection. A method for obtaining cryptographic services for a browser executing a webpage comprising the steps of establishing a persistent peer-to-peer connection over a wireless Internet Protocol communication network between the browser and a cryptographic device, in response to receiving user input to the webpage, transmitting, by the browser, data indicated by the user input over the persistent peer-to-peer connection to the cryptographic device, for cryptographic processing of the data by the
(Continued)

cryptographic device using a cryptographic key stored on the cryptographic device to produce a cryptographic result, and receiving, by the browser, the cryptographic result over the persistent peer-to-peer connection from the cryptographic device, and providing the cryptographic result to the webpage.

20 Claims, 10 Drawing Sheets

(51) Int. Cl.
| | | |
|---|---|---|
| *H04L 9/08* | (2006.01) | |
| *H04L 9/40* | (2022.01) | |
| *H04L 67/02* | (2022.01) | |
| *H04L 67/06* | (2022.01) | |
| *H04L 67/104* | (2022.01) | |
| *H04L 67/141* | (2022.01) | |
| *H04W 12/77* | (2021.01) | |
| *G06F 21/35* | (2013.01) | |
| *G06F 21/60* | (2013.01) | |
| *G06F 21/62* | (2013.01) | |

(52) U.S. Cl.
CPC ........ *H04L 9/3247* (2013.01); *H04L 63/0853* (2013.01); *H04L 63/126* (2013.01); *H04L 67/02* (2013.01); *H04L 67/06* (2013.01); *H04L 67/104* (2013.01); *H04L 67/141* (2013.01); *H04W 12/77* (2021.01); *G06F 21/35* (2013.01); *G06F 21/602* (2013.01); *G06F 21/6209* (2013.01); *H04L 9/0827* (2013.01); *H04L 63/0428* (2013.01)

(56) References Cited

U.S. PATENT DOCUMENTS

| | | | | |
|---|---|---|---|---|
| 5,557,346 | A * | 9/1996 | Lipner | H04L 9/0894 |
| | | | | 380/285 |
| 5,557,765 | A * | 9/1996 | Lipner | H04L 9/3271 |
| | | | | 380/285 |
| 5,577,121 | A * | 11/1996 | Davis | H04L 9/3247 |
| | | | | 705/68 |
| 5,590,196 | A * | 12/1996 | Moreau | G06Q 20/401 |
| | | | | 380/243 |
| 6,052,468 | A * | 4/2000 | Hillhouse | H04L 9/0891 |
| | | | | 380/281 |
| 6,144,739 | A * | 11/2000 | Witt | H04L 63/123 |
| | | | | 380/278 |
| 6,278,783 | B1 * | 8/2001 | Kocher | H04L 9/003 |
| | | | | 380/42 |
| 6,289,455 | B1 * | 9/2001 | Kocher | G06F 21/72 |
| | | | | 713/172 |
| 6,510,518 | B1 * | 1/2003 | Jaffe | H04L 63/1441 |
| | | | | 713/168 |
| 6,711,740 | B1 * | 3/2004 | Moon | H04L 67/564 |
| | | | | 709/230 |
| 7,051,199 | B1 * | 5/2006 | Berson | H04L 63/0428 |
| | | | | 380/278 |
| 7,082,535 | B1 | 7/2006 | Norman et al. | |
| 7,353,252 | B1 * | 4/2008 | Yang | G06Q 10/10 |
| | | | | 709/204 |
| 7,478,172 | B1 * | 1/2009 | Lee | G06Q 10/06 |
| | | | | 709/250 |
| 7,707,225 | B2 * | 4/2010 | Akashika | G06Q 20/327 |
| | | | | 380/278 |
| 7,783,046 | B1 * | 8/2010 | Sklyarov | H04L 9/0894 |
| | | | | 380/46 |
| 7,797,423 | B2 * | 9/2010 | Holden | H04L 63/02 |
| | | | | 709/227 |
| 7,813,822 | B1 * | 10/2010 | Hoffberg | H04N 7/163 |
| | | | | 381/73.1 |
| 7,844,670 | B2 * | 11/2010 | Roskowski | H04L 51/04 |
| | | | | 709/227 |
| 7,853,995 | B2 * | 12/2010 | Chow | H04L 63/0807 |
| | | | | 726/19 |
| 7,916,864 | B2 * | 3/2011 | Juffa | G06F 9/30181 |
| | | | | 713/168 |
| 7,917,628 | B2 * | 3/2011 | Hesselink | H04L 63/029 |
| | | | | 709/227 |
| 7,917,744 | B2 * | 3/2011 | Radatti | H04L 63/0245 |
| | | | | 713/188 |
| 7,987,510 | B2 * | 7/2011 | Kocher | G11B 20/00659 |
| | | | | 726/28 |
| 8,086,844 | B2 * | 12/2011 | Buer | G06F 21/57 |
| | | | | 713/153 |
| 8,136,025 | B1 * | 3/2012 | Zhu | G06F 16/951 |
| | | | | 707/637 |
| 8,290,161 | B2 * | 10/2012 | Yung | H04L 9/0838 |
| | | | | 380/255 |
| 8,302,169 | B1 * | 10/2012 | Presotto | G06F 21/6218 |
| | | | | 726/19 |
| 8,315,381 | B2 * | 11/2012 | Qi | G06F 9/30007 |
| | | | | 713/166 |
| 8,316,237 | B1 * | 11/2012 | Felsher | H04L 63/061 |
| | | | | 380/282 |
| 8,494,168 | B1 * | 7/2013 | Tolfmans | G06F 21/602 |
| | | | | 380/47 |
| 8,582,760 | B2 * | 11/2013 | Rosati | H04L 63/0442 |
| | | | | 713/168 |
| 8,615,787 | B2 * | 12/2013 | Murray | H04L 63/0853 |
| | | | | 380/281 |
| 8,693,686 | B2 * | 4/2014 | Radatti | H04K 1/00 |
| | | | | 380/255 |
| 8,695,077 | B1 | 4/2014 | Gerhard et al. | |
| 8,752,203 | B2 * | 6/2014 | Reinertsen | G06F 21/34 |
| | | | | 726/28 |
| 8,856,869 | B1 * | 10/2014 | Brinskelle | H04L 63/0823 |
| | | | | 726/2 |
| 8,924,505 | B2 * | 12/2014 | Molland | H04L 67/59 |
| | | | | 709/217 |
| 9,015,857 | B2 | 4/2015 | Sprague et al. | |
| 9,177,293 | B1 * | 11/2015 | Gagnon | H04L 51/212 |
| 9,189,627 | B1 * | 11/2015 | Islam | H04L 63/1408 |
| 9,208,488 | B2 * | 12/2015 | Liberty | G06Q 20/202 |
| 9,235,714 | B1 * | 1/2016 | Cignetti | G06F 21/6218 |
| 9,258,120 | B1 * | 2/2016 | Allen | H04L 9/0891 |
| 9,288,190 | B1 * | 3/2016 | Brinskelle | H04L 63/1433 |
| 9,292,711 | B1 * | 3/2016 | Roth | G06F 21/34 |
| 9,317,708 | B2 * | 4/2016 | Lee | H04L 9/0844 |
| 9,332,433 | B1 * | 5/2016 | Dotan | H04L 63/0815 |
| 9,363,073 | B2 * | 6/2016 | Teglia | H04L 9/002 |
| 9,397,835 | B1 * | 7/2016 | Campagna | H04L 9/0825 |
| 9,406,043 | B1 * | 8/2016 | Amacker | H04L 67/104 |
| 9,444,795 | B1 * | 9/2016 | Kowalski | H04L 67/02 |
| 9,466,054 | B1 * | 10/2016 | Bradley | H04L 67/1061 |
| 9,471,466 | B1 * | 10/2016 | Garcia | G06F 11/3644 |
| 9,485,098 | B1 * | 11/2016 | Lepeshenkov | G06F 21/62 |
| 9,495,145 | B1 * | 11/2016 | Brech | G06F 3/1225 |
| 9,565,175 | B1 * | 2/2017 | Saylor | G06F 21/10 |
| 9,569,735 | B1 * | 2/2017 | Zhu | G06N 20/00 |
| 9,584,325 | B1 * | 2/2017 | Brandwine | H04L 63/0272 |
| 9,608,813 | B1 * | 3/2017 | Roth | H04L 63/0807 |
| 9,609,003 | B1 * | 3/2017 | Chmielewski | H04L 67/025 |
| 9,614,899 | B1 * | 4/2017 | Rukonic | H04L 67/34 |
| 9,680,908 | B1 * | 6/2017 | Saylor | G06F 21/645 |
| 9,692,757 | B1 * | 6/2017 | Mikulski | H04L 9/3234 |
| 9,729,524 | B1 * | 8/2017 | Brandwine | H04L 9/0894 |
| 9,754,130 | B2 * | 9/2017 | Trent | H04L 67/104 |
| 9,756,020 | B2 * | 9/2017 | Kaufman | H04L 63/08 |
| 9,806,887 | B1 * | 10/2017 | Campagna | H04L 9/0822 |
| 9,853,811 | B1 * | 12/2017 | Levy | H04L 9/088 |
| 9,866,393 | B1 * | 1/2018 | Rush | H04L 9/3236 |
| 9,871,652 | B2 * | 1/2018 | Morikawa | G09C 1/00 |
| 9,882,720 | B1 * | 1/2018 | Levy | H04L 63/123 |
| 9,992,029 | B1 * | 6/2018 | Jackson | H04L 9/3263 |
| 10,021,113 | B2 * | 7/2018 | Oberheide | H04L 9/3247 |
| 10,078,754 | B1 * | 9/2018 | Brandwine | G06F 21/78 |
| 10,091,144 | B1 * | 10/2018 | Nodine | G06F 16/24 |

(56) References Cited

U.S. PATENT DOCUMENTS

| | | | |
|---|---|---|---|
| 10,110,382 B1* | 10/2018 | Roth | H04L 9/0894 |
| 10,123,230 B1* | 11/2018 | Govindassamy | H04W 56/001 |
| 10,129,211 B2* | 11/2018 | Heath | G06Q 30/02 |
| 10,129,321 B2* | 11/2018 | Mayya | H04L 67/02 |
| 10,142,301 B1* | 11/2018 | Sharifi Mehr | G06F 21/606 |
| 10,165,490 B1* | 12/2018 | Govindassamy | H04W 4/80 |
| 10,185,957 B2* | 1/2019 | Quigley | H04W 12/065 |
| 10,193,690 B1* | 1/2019 | Self | H04L 9/0894 |
| 10,218,682 B1* | 2/2019 | Kawach | H04L 9/3242 |
| 10,230,790 B2* | 3/2019 | Wang | H04L 69/24 |
| 10,237,246 B1* | 3/2019 | Mulayin | H04L 9/0894 |
| 10,277,576 B1* | 4/2019 | Yau | H04L 9/3236 |
| 10,284,530 B1 | 5/2019 | Kuo et al. | |
| 10,291,401 B1* | 5/2019 | Norum | H04L 63/0823 |
| 10,313,117 B1* | 6/2019 | Carlough | H04L 9/302 |
| 10,313,123 B1 | 6/2019 | Grubin et al. | |
| 10,348,702 B1* | 7/2019 | Sundaram | G06F 21/10 |
| 10,374,809 B1* | 8/2019 | Dasarakothapalli | H04L 9/30 |
| 10,411,894 B1* | 9/2019 | Yavnilovich | H04W 12/06 |
| 10,425,225 B1* | 9/2019 | Grubin | H04L 9/0643 |
| 10,425,497 B1* | 9/2019 | de Waal | H04L 67/2871 |
| 10,454,897 B1* | 10/2019 | Rajanna | H04L 63/0281 |
| 10,462,114 B2* | 10/2019 | Poffenbarger | H04L 9/3234 |
| 10,469,262 B1* | 11/2019 | Schroeder | H04L 63/123 |
| 10,476,663 B1* | 11/2019 | Lazier | G06F 21/602 |
| 10,491,576 B1* | 11/2019 | Pfannenschmidt | H04L 9/14 |
| 10,503,918 B2* | 12/2019 | Byszio | H04L 63/0435 |
| 10,505,736 B1* | 12/2019 | Meixler | H04L 9/3236 |
| 10,511,448 B1* | 12/2019 | Brinskelle | H04L 63/166 |
| 10,523,434 B1* | 12/2019 | Sharifi Mehr | H04L 9/0891 |
| 10,558,824 B1* | 2/2020 | Remington | H04L 67/02 |
| 10,560,539 B1* | 2/2020 | Loch | G06F 16/95 |
| 10,608,813 B1* | 3/2020 | Lazier | G06F 21/602 |
| 10,630,682 B1* | 4/2020 | Bhattacharyya | H04L 63/0869 |
| 10,740,974 B1* | 8/2020 | Cowburn | G06Q 50/01 |
| 10,742,626 B2* | 8/2020 | Oberheide | H04L 63/083 |
| 10,749,925 B1* | 8/2020 | Hudgin | H04L 67/568 |
| 10,764,294 B1* | 9/2020 | Wasiq | H04L 63/10 |
| 10,771,255 B1* | 9/2020 | Roth | H04L 9/0819 |
| 10,797,871 B1* | 10/2020 | McCormack | H04L 9/0643 |
| 10,819,709 B1* | 10/2020 | M'Raihi | H04L 63/0807 |
| 10,862,689 B1* | 12/2020 | Aizikovich | H04L 9/3231 |
| 10,887,107 B1* | 1/2021 | Chan | H04L 9/3271 |
| 10,911,224 B1* | 2/2021 | Marappan | H04W 12/106 |
| 11,017,067 B2* | 5/2021 | Smales | H04L 9/3271 |
| 11,023,595 B1* | 6/2021 | Allen | G06F 16/248 |
| 11,029,922 B2* | 6/2021 | Chabrier | G06F 7/721 |
| 11,057,210 B1* | 7/2021 | Sierra | H04L 9/3226 |
| 11,089,081 B1* | 8/2021 | Karppanen | H04L 67/01 |
| 11,153,074 B1* | 10/2021 | Nikitas | H04L 9/0897 |
| 11,184,157 B1* | 11/2021 | Gueron | H04L 9/14 |
| 11,184,406 B1* | 11/2021 | Shashank | H04L 67/1095 |
| 11,190,569 B2* | 11/2021 | Yu | H04L 61/5007 |
| 11,218,317 B1* | 1/2022 | Miller | H04L 9/0897 |
| 11,218,435 B1* | 1/2022 | Brody | H04L 67/5683 |
| 11,218,465 B2* | 1/2022 | Glozman | H04L 61/2592 |
| 11,233,647 B1* | 1/2022 | Fontaine | H04L 9/3215 |
| 11,240,023 B1* | 2/2022 | Donlan | H04L 9/088 |
| 11,245,521 B1* | 2/2022 | Hathorn | H04L 9/0891 |
| 11,343,242 B2* | 5/2022 | Manikantan | H04W 12/63 |
| 11,388,226 B1* | 7/2022 | Anderton | G06Q 10/10 |
| 11,392,714 B1* | 7/2022 | Matthews | H04L 9/0894 |
| 11,475,140 B1* | 10/2022 | Buonora | G06F 21/602 |
| 11,537,421 B1* | 12/2022 | Brooker | H04L 9/0894 |
| 11,544,677 B2* | 1/2023 | Vagare | H04L 9/0866 |
| 11,630,877 B1* | 4/2023 | Cansizoglu | G06F 16/955 |
| | | | 715/207 |
| 11,677,846 B1* | 6/2023 | Howes | H04L 67/535 |
| | | | 709/224 |
| 11,764,948 B1* | 9/2023 | Rambhia | H04L 9/0877 |
| | | | 380/277 |
| 11,765,698 B2* | 9/2023 | Kurian | H04W 72/044 |
| | | | 370/330 |
| 11,770,260 B1* | 9/2023 | Pamucci | H04N 21/8358 |
| 11,921,905 B2* | 3/2024 | Savagaonkar | H04L 63/0428 |
| 11,960,611 B2* | 4/2024 | Pohl | H04L 12/403 |
| 2002/0114470 A1* | 8/2002 | Mauro, II | H04L 9/0894 |
| | | | 380/270 |
| 2002/0116342 A1* | 8/2002 | Hirano | G06Q 10/087 |
| | | | 705/64 |
| 2002/0141582 A1* | 10/2002 | Kocher | H04N 21/44236 |
| | | | 380/201 |
| 2002/0147771 A1* | 10/2002 | Traversat | H04L 63/0428 |
| | | | 709/250 |
| 2002/0194483 A1* | 12/2002 | Wenocur | H04L 63/126 |
| | | | 713/185 |
| 2003/0093663 A1* | 5/2003 | Walker | H04L 9/3271 |
| | | | 713/150 |
| 2003/0105812 A1* | 6/2003 | Flowers, Jr. | H04L 63/029 |
| | | | 709/203 |
| 2003/0110296 A1* | 6/2003 | Kirsch | H04L 9/40 |
| | | | 709/230 |
| 2003/0174843 A1* | 9/2003 | Odell | H04L 9/06 |
| | | | 380/277 |
| 2003/0187918 A1* | 10/2003 | Burbeck | H04L 63/10 |
| | | | 709/203 |
| 2003/0187973 A1* | 10/2003 | Wesley | H04L 67/51 |
| | | | 709/224 |
| 2004/0008249 A1* | 1/2004 | Nelson | H04N 7/152 |
| | | | 348/14.09 |
| 2004/0008635 A1* | 1/2004 | Nelson | H04N 7/152 |
| | | | 709/204 |
| 2004/0066770 A1* | 4/2004 | Pabla | H04L 9/40 |
| | | | 370/338 |
| 2004/0078775 A1* | 4/2004 | Chow | G06F 21/31 |
| | | | 717/100 |
| 2004/0088646 A1* | 5/2004 | Yeager | H04L 67/1044 |
| | | | 715/255 |
| 2004/0101141 A1* | 5/2004 | Alve | H04L 9/0822 |
| | | | 380/278 |
| 2004/0249993 A1* | 12/2004 | Hori | G06F 21/80 |
| | | | 710/20 |
| 2005/0088983 A1* | 4/2005 | Wesslen | H04W 88/02 |
| | | | 370/313 |
| 2005/0125661 A1* | 6/2005 | Vaidyanathan | G06F 21/53 |
| | | | 713/189 |
| 2005/0174986 A1* | 8/2005 | Emond | H04L 67/08 |
| | | | 370/351 |
| 2006/0005048 A1* | 1/2006 | Osaki | G06F 21/6218 |
| | | | 713/193 |
| 2006/0037072 A1* | 2/2006 | Rao | H04L 45/30 |
| | | | 726/14 |
| 2006/0129813 A1* | 6/2006 | Narayanan | H04L 9/321 |
| | | | 713/168 |
| 2006/0149840 A1* | 7/2006 | Thompson | H04L 47/829 |
| | | | 709/224 |
| 2006/0174352 A1* | 8/2006 | Thibadeau | G06Q 20/341 |
| | | | 713/193 |
| 2006/0198515 A1* | 9/2006 | Forehand | G06F 21/80 |
| | | | 380/28 |
| 2006/0200550 A1* | 9/2006 | Nelson | H04L 65/1101 |
| | | | 709/224 |
| 2006/0212592 A1* | 9/2006 | Gupta | H04L 67/104 |
| | | | 709/230 |
| 2006/0242415 A1* | 10/2006 | Gaylor | H04L 9/3271 |
| | | | 713/176 |
| 2006/0280191 A1 | 12/2006 | Nishida et al. | |
| 2006/0291657 A1* | 12/2006 | Benson | G08B 25/14 |
| | | | 709/224 |
| 2006/0294213 A1* | 12/2006 | Saridakis | H04L 67/56 |
| | | | 709/223 |
| 2007/0033419 A1* | 2/2007 | Kocher | G11B 20/00884 |
| | | | 713/193 |
| 2007/0098153 A1* | 5/2007 | Nishikawa | H04L 9/0631 |
| | | | 380/30 |
| 2007/0124406 A1* | 5/2007 | Liu | H04L 67/025 |
| | | | 709/209 |
| 2007/0143397 A1* | 6/2007 | Guedalia | H04L 67/141 |
| | | | 709/203 |
| 2007/0278285 A1* | 12/2007 | Ehrensvaerd | H04L 9/321 |
| | | | 235/375 |

(56) References Cited

U.S. PATENT DOCUMENTS

| | | | |
|---|---|---|---|
| 2008/0063183 A1* | 3/2008 | Greco | H04L 9/0894 380/2 |
| 2008/0104399 A1* | 5/2008 | Fascenda | H04L 9/3234 713/168 |
| 2008/0114995 A1* | 5/2008 | Jogand-Coulomb | H04L 9/0894 713/193 |
| 2008/0141336 A1* | 6/2008 | Haller | G06Q 20/382 726/1 |
| 2008/0181399 A1* | 7/2008 | Weise | G06F 21/72 380/28 |
| 2008/0209075 A1* | 8/2008 | Shamma | H04L 9/40 709/248 |
| 2009/0010424 A1* | 1/2009 | Qi | H04L 9/005 717/106 |
| 2009/0037338 A1* | 2/2009 | Braun | G06Q 10/107 705/60 |
| 2009/0041245 A1* | 2/2009 | Torisaki | H04L 9/065 380/42 |
| 2009/0066788 A1* | 3/2009 | Baum | H04L 12/2818 375/E7.076 |
| 2009/0066789 A1* | 3/2009 | Baum | G06F 16/954 375/240.01 |
| 2009/0070473 A1* | 3/2009 | Baum | H04L 67/025 709/227 |
| 2009/0070477 A1* | 3/2009 | Baum | H04L 12/2818 709/231 |
| 2009/0074184 A1* | 3/2009 | Baum | G06F 16/954 709/201 |
| 2009/0097651 A1* | 4/2009 | Whillock | H04L 63/0428 380/258 |
| 2009/0129586 A1* | 5/2009 | Miyazaki | H04L 63/20 707/999.005 |
| 2009/0138700 A1* | 5/2009 | Miyazaki | H04L 9/0894 707/E17.014 |
| 2009/0214030 A1* | 8/2009 | Price, III | H04L 9/085 380/279 |
| 2009/0276547 A1* | 11/2009 | Rosenblatt | F01N 3/2073 710/33 |
| 2009/0287837 A1* | 11/2009 | Felsher | G06F 21/6245 709/229 |
| 2009/0288159 A1* | 11/2009 | Husemann | H04L 9/3271 726/16 |
| 2009/0319804 A1* | 12/2009 | Qi | H04L 9/3013 713/190 |
| 2010/0005297 A1* | 1/2010 | Ganesan | H04L 63/0823 713/169 |
| 2010/0030734 A1* | 2/2010 | Chunilal | H04L 51/214 709/205 |
| 2010/0077212 A1* | 3/2010 | McReynolds | H04L 9/3271 380/278 |
| 2010/0105322 A1* | 4/2010 | Bertin | H04L 63/08 235/382 |
| 2010/0138666 A1* | 6/2010 | Adams | G07F 7/1091 713/186 |
| 2010/0153989 A1* | 6/2010 | Jing | H04L 67/104 725/110 |
| 2010/0161995 A1* | 6/2010 | Browning | H04L 9/0891 713/189 |
| 2010/0189262 A1* | 7/2010 | Ducharme | H04N 21/4183 706/47 |
| 2010/0232601 A1* | 9/2010 | Itoh | G06F 7/725 380/28 |
| 2010/0235285 A1* | 9/2010 | Hoffberg | G06Q 50/188 705/37 |
| 2010/0235523 A1* | 9/2010 | Garcia | H04L 67/51 709/228 |
| 2010/0275025 A1* | 10/2010 | Parkinson | H04L 9/3247 713/176 |
| 2010/0317420 A1* | 12/2010 | Hoffberg | G06Q 30/0282 463/1 |
| 2010/0332845 A1* | 12/2010 | Asaka | H04L 63/061 713/189 |
| 2011/0026474 A1* | 2/2011 | Freda | H04W 72/29 370/329 |
| 2011/0099278 A1* | 4/2011 | Marr | H04L 9/40 709/226 |
| 2011/0113034 A1* | 5/2011 | Sidman | G06Q 30/0601 707/E17.089 |
| 2011/0145592 A1* | 6/2011 | Greiner | G06F 21/602 713/189 |
| 2011/0154025 A1* | 6/2011 | Spalka | H04L 9/3236 713/182 |
| 2011/0185082 A1* | 7/2011 | Thompson | H04L 67/02 709/245 |
| 2011/0252238 A1* | 10/2011 | Abuan | H04L 63/068 713/168 |
| 2011/0276700 A1* | 11/2011 | Chaturvedi | H04L 67/141 709/227 |
| 2011/0296198 A1* | 12/2011 | Motoyama | H04L 9/0625 713/189 |
| 2011/0296238 A1* | 12/2011 | Abzarian | G06F 21/85 713/189 |
| 2012/0028615 A1* | 2/2012 | Sundaramurthy | H04L 67/025 455/412.2 |
| 2012/0084349 A1* | 4/2012 | Lee | H04L 67/025 709/203 |
| 2012/0087494 A1* | 4/2012 | Spalka | H04L 9/3066 380/46 |
| 2012/0093313 A1* | 4/2012 | Michiels | G09C 1/00 380/255 |
| 2012/0129493 A1* | 5/2012 | Vasudevan | H04L 9/3271 455/411 |
| 2012/0173387 A1* | 7/2012 | Talker | G06Q 30/0601 705/26.1 |
| 2012/0209686 A1* | 8/2012 | Horowitz | G06Q 30/0224 705/14.26 |
| 2012/0246301 A1* | 9/2012 | Vyrros | A63F 13/34 709/224 |
| 2012/0263299 A1* | 10/2012 | Akhavan-Toyserkani | H04L 9/12 380/255 |
| 2012/0284506 A1* | 11/2012 | Kravitz | G06Q 40/00 713/150 |
| 2012/0316940 A1* | 12/2012 | Moshfeghi | G06Q 30/02 705/26.8 |
| 2013/0013928 A1* | 1/2013 | Thom | G06F 21/30 713/182 |
| 2013/0054474 A1* | 2/2013 | Yeager | H04L 9/3271 705/71 |
| 2013/0061054 A1* | 3/2013 | Niccolai | H04L 9/083 713/171 |
| 2013/0080768 A1* | 3/2013 | Lagerway | H04L 9/321 713/176 |
| 2013/0111211 A1* | 5/2013 | Winslow | H04L 9/3234 713/150 |
| 2013/0124860 A1* | 5/2013 | Maidl | H04L 63/123 713/164 |
| 2013/0145160 A1* | 6/2013 | Bursell | G06F 21/6218 713/168 |
| 2013/0159021 A1* | 6/2013 | Felsher | G16H 10/60 705/3 |
| 2013/0238907 A1* | 9/2013 | Debout | H04L 9/0894 713/193 |
| 2013/0254087 A1* | 9/2013 | Rooz | G06Q 40/04 705/37 |
| 2013/0262851 A1* | 10/2013 | Hirvonen | H04L 63/145 713/150 |
| 2014/0006660 A1* | 1/2014 | Frei | H04L 43/10 710/104 |
| 2014/0012895 A1* | 1/2014 | Lieberman | H04L 67/55 709/203 |
| 2014/0012906 A1* | 1/2014 | Teja | H04L 67/02 709/204 |
| 2014/0013123 A1* | 1/2014 | Khazan | H04L 63/061 713/189 |

(56) References Cited

U.S. PATENT DOCUMENTS

| | | | |
|---|---|---|---|
| 2014/0013434 A1* | 1/2014 | Ranum | G06F 21/564 |
| | | | 726/24 |
| 2014/0025944 A1* | 1/2014 | Maletsky | G06F 21/57 |
| | | | 713/150 |
| 2014/0032785 A1* | 1/2014 | Chaudhuri | H04L 67/1001 |
| | | | 709/245 |
| 2014/0032902 A1* | 1/2014 | Agrawal | H04L 63/0815 |
| | | | 713/168 |
| 2014/0058792 A1* | 2/2014 | Talker | G06Q 30/0601 |
| | | | 705/7.29 |
| 2014/0122585 A1* | 5/2014 | DeLong | G06Q 10/10 |
| | | | 709/204 |
| 2014/0123220 A1 | 5/2014 | Sprunk et al. | |
| 2014/0149512 A1* | 5/2014 | Leitch | H04L 67/1061 |
| | | | 709/204 |
| 2014/0164250 A1 | 6/2014 | Sahasranaman et al. | |
| 2014/0195804 A1* | 7/2014 | Hursti | H04L 9/0863 |
| | | | 713/168 |
| 2014/0222894 A1* | 8/2014 | Gangadharan | H04L 65/1033 |
| | | | 709/203 |
| 2014/0237239 A1* | 8/2014 | Hursti | H04L 9/32 |
| | | | 713/168 |
| 2014/0237252 A1* | 8/2014 | Hursti | H04L 9/30 |
| | | | 713/176 |
| 2014/0259147 A1* | 9/2014 | L'Heureux | H04L 63/02 |
| | | | 726/14 |
| 2014/0282071 A1* | 9/2014 | Trachtenberg | G06F 3/0484 |
| | | | 715/748 |
| 2014/0282974 A1* | 9/2014 | Maher | H04L 63/08 |
| | | | 726/7 |
| 2014/0289535 A1* | 9/2014 | Gan | H04L 9/32 |
| | | | 713/189 |
| 2014/0324967 A1* | 10/2014 | Atias | H04L 67/06 |
| | | | 709/204 |
| 2014/0334464 A1* | 11/2014 | Qi | H04L 67/141 |
| | | | 370/338 |
| 2014/0344569 A1 | 11/2014 | Li | |
| 2014/0351478 A1* | 11/2014 | Lee | H04L 67/02 |
| | | | 710/303 |
| 2014/0351832 A1* | 11/2014 | Cho | H04L 67/141 |
| | | | 719/328 |
| 2014/0366155 A1* | 12/2014 | Chang | G06F 9/45558 |
| | | | 726/27 |
| 2014/0380037 A1* | 12/2014 | Matsuda | H04L 63/06 |
| | | | 713/150 |
| 2015/0006672 A1* | 1/2015 | Morel | G06Q 30/0269 |
| | | | 709/217 |
| 2015/0010146 A1* | 1/2015 | Matsuda | H04L 9/0816 |
| | | | 380/44 |
| 2015/0022666 A1* | 1/2015 | Kay | H04L 65/65 |
| | | | 348/159 |
| 2015/0039904 A1* | 2/2015 | Matsuda | H04L 9/0618 |
| | | | 713/189 |
| 2015/0054947 A1* | 2/2015 | Dawes | G08B 13/19682 |
| | | | 348/143 |
| 2015/0074408 A1* | 3/2015 | Oberheide | H04L 9/083 |
| | | | 713/171 |
| 2015/0081846 A1* | 3/2015 | Ur-Rahman | H04L 63/04 |
| | | | 709/218 |
| 2015/0089233 A1* | 3/2015 | Roth | H04L 67/02 |
| | | | 713/168 |
| 2015/0096001 A1* | 4/2015 | Morikuni | H04L 63/123 |
| | | | 726/7 |
| 2015/0103730 A1* | 4/2015 | Emmanuel | H04W 74/002 |
| | | | 370/329 |
| 2015/0105121 A1* | 4/2015 | Emmanuel | H04W 74/002 |
| | | | 455/553.1 |
| 2015/0121454 A1* | 4/2015 | Cox | H04L 65/1069 |
| | | | 726/2 |
| 2015/0186658 A1* | 7/2015 | Marien | H04L 63/0823 |
| | | | 713/165 |
| 2015/0188702 A1* | 7/2015 | Men | H04L 63/06 |
| | | | 713/153 |
| 2015/0189024 A1* | 7/2015 | Misra | H04M 7/0027 |
| | | | 709/205 |
| 2015/0195263 A1* | 7/2015 | Wilson | G06F 21/52 |
| | | | 726/9 |
| 2015/0213138 A1* | 7/2015 | Lee | H04L 67/025 |
| | | | 707/736 |
| 2015/0280986 A1* | 10/2015 | Abuan | H04W 4/203 |
| | | | 709/221 |
| 2015/0287026 A1* | 10/2015 | Yang | G06Q 20/065 |
| | | | 705/69 |
| 2015/0288682 A1* | 10/2015 | Bisroev | G16H 40/20 |
| | | | 713/172 |
| 2015/0310230 A1* | 10/2015 | Shirai | G06F 21/72 |
| | | | 713/189 |
| 2015/0331727 A1* | 11/2015 | Mameri | G06F 9/547 |
| | | | 719/315 |
| 2015/0350333 A1* | 12/2015 | Cutler | H04L 12/1822 |
| | | | 709/227 |
| 2015/0358400 A1* | 12/2015 | Bartlett, II | H04W 12/10 |
| | | | 709/201 |
| 2016/0021167 A1* | 1/2016 | Park | H04L 67/025 |
| | | | 715/740 |
| 2016/0044621 A1* | 2/2016 | Ding | H04L 67/104 |
| | | | 370/350 |
| 2016/0050703 A1* | 2/2016 | Johnsson | H04W 8/005 |
| | | | 370/329 |
| 2016/0057114 A1* | 2/2016 | Unagami | H04W 12/08 |
| | | | 713/171 |
| 2016/0065542 A1* | 3/2016 | Driscoll | H04L 63/0428 |
| | | | 713/168 |
| 2016/0080326 A1* | 3/2016 | Brand | H04L 63/08 |
| | | | 713/155 |
| 2016/0080503 A1* | 3/2016 | Guo | G06Q 20/353 |
| | | | 709/227 |
| 2016/0099919 A1* | 4/2016 | Daniels | H04L 67/141 |
| | | | 713/155 |
| 2016/0117262 A1* | 4/2016 | Thom | H04L 9/0825 |
| | | | 713/189 |
| 2016/0119400 A1* | 4/2016 | Elliott | H04L 67/01 |
| | | | 709/203 |
| 2016/0134599 A1* | 5/2016 | Ross | H04L 63/0815 |
| | | | 713/168 |
| 2016/0134603 A1* | 5/2016 | Cregg | H04W 12/0431 |
| | | | 380/278 |
| 2016/0154744 A1* | 6/2016 | Zheng | H04L 9/088 |
| | | | 713/193 |
| 2016/0156719 A1* | 6/2016 | Mobarak | H04L 67/56 |
| | | | 726/4 |
| 2016/0165376 A1* | 6/2016 | Qi | H04L 67/141 |
| | | | 455/414.1 |
| 2016/0171221 A1* | 6/2016 | Arnold | G06F 21/46 |
| | | | 713/189 |
| 2016/0173537 A1* | 6/2016 | Kumar | H04L 67/141 |
| | | | 709/228 |
| 2016/0182500 A1* | 6/2016 | Ligatti | H04L 63/0853 |
| | | | 713/156 |
| 2016/0205074 A1* | 7/2016 | Mitchell | H04L 63/045 |
| | | | 713/171 |
| 2016/0218873 A1* | 7/2016 | Spiro | G06F 21/44 |
| 2016/0234259 A1* | 8/2016 | Talmaki | G08G 1/00 |
| 2016/0241660 A1* | 8/2016 | Nhu | H04W 4/80 |
| 2016/0255070 A1* | 9/2016 | Näslund | H04L 9/0816 |
| | | | 713/171 |
| 2016/0269174 A1* | 9/2016 | Yasuda | H04L 9/008 |
| 2016/0277202 A1* | 9/2016 | Davis | H04L 12/283 |
| 2016/0285625 A1* | 9/2016 | Roth | H04L 9/0825 |
| 2016/0285802 A1* | 9/2016 | Brandenburg | H04L 41/22 |
| 2016/0285948 A1 | 9/2016 | Saint-Hilaire et al. | |
| 2016/0294783 A1* | 10/2016 | Piqueras Jover | H04W 12/04 |
| 2016/0300306 A1* | 10/2016 | Simburg | G06Q 30/0251 |
| 2016/0308721 A1* | 10/2016 | Dellisanti | G06F 11/2035 |
| 2016/0308932 A1* | 10/2016 | Gibbons | G06F 16/00 |
| 2016/0314513 A1* | 10/2016 | Velusamy | G06Q 30/0633 |
| 2016/0315765 A1* | 10/2016 | Zheng | H04L 9/0894 |

(56) References Cited

U.S. PATENT DOCUMENTS

| | | | | |
|---|---|---|---|---|
| 2016/0344549 A1* | 11/2016 | Campagna | | G06F 21/602 |
| 2016/0366250 A1* | 12/2016 | Lee | | H04L 67/306 |
| 2017/0019939 A1* | 1/2017 | Shin | | H04W 8/00 |
| 2017/0026339 A1* | 1/2017 | Degenkolb | | H04L 63/08 |
| 2017/0032366 A1* | 2/2017 | Kumar | | H04B 1/385 |
| 2017/0038916 A1* | 2/2017 | Beach | | G06F 16/9535 |
| 2017/0046651 A1* | 2/2017 | Lin | | G06Q 50/08 |
| 2017/0070361 A1* | 3/2017 | Sundermeyer | | H04L 67/025 |
| 2017/0070563 A1* | 3/2017 | Sundermeyer | | H04L 67/025 |
| 2017/0098011 A1* | 4/2017 | Islam | | G06F 16/9027 |
| 2017/0111788 A1* | 4/2017 | Cotta | | H04L 63/08 |
| 2017/0126681 A1* | 5/2017 | Barrett | | H04L 9/3226 |
| 2017/0140456 A1* | 5/2017 | Kong | | G06Q 30/0641 |
| 2017/0149562 A1* | 5/2017 | Takada | | H04L 9/0891 |
| 2017/0155694 A1* | 6/2017 | Pinkovezky | | H04L 67/535 |
| 2017/0192983 A1* | 7/2017 | Weng | | G06F 40/106 |
| 2017/0195675 A1* | 7/2017 | Nathan | | H04N 23/617 |
| 2017/0208463 A1* | 7/2017 | Brand | | H04W 12/06 |
| 2017/0213212 A1* | 7/2017 | Dicker | | G06Q 20/10 |
| 2017/0220011 A1* | 8/2017 | Hart | | G05B 19/0428 |
| 2017/0220012 A1* | 8/2017 | Hart | | H04L 67/12 |
| 2017/0221071 A1* | 8/2017 | Von Sichart | | G06Q 10/1093 |
| 2017/0221055 A1* | 8/2017 | Carlsson | | G06Q 20/40 |
| 2017/0223026 A1* | 8/2017 | Amiri | | H04L 63/20 |
| 2017/0223057 A1* | 8/2017 | Amiri | | H04L 67/306 |
| 2017/0223093 A1* | 8/2017 | Peterson | | H04L 67/10 |
| 2017/0223138 A1* | 8/2017 | Amiri | | H04L 67/63 |
| 2017/0230365 A1* | 8/2017 | Poete | | H04L 9/30 |
| 2017/0235956 A1* | 8/2017 | Maletsky | | H04L 63/123 726/1 |
| 2017/0242555 A1* | 8/2017 | Wragg | | H04L 67/02 |
| 2017/0243271 A1* | 8/2017 | You | | H04L 51/52 |
| 2017/0244695 A1* | 8/2017 | Lund | | H04L 63/083 |
| 2017/0244778 A1* | 8/2017 | Zhu | | H04L 67/306 |
| 2017/0256007 A1* | 9/2017 | Barman | | G06Q 20/14 |
| 2017/0262643 A1* | 9/2017 | Aldis | | G06F 21/14 |
| 2017/0289233 A1* | 10/2017 | Margatan | | H04L 67/565 |
| 2017/0293575 A1* | 10/2017 | Best | | G11C 13/0059 |
| 2017/0295226 A1* | 10/2017 | Basta | | H04L 67/1042 |
| 2017/0301063 A1* | 10/2017 | Merhav | | G06V 40/161 |
| 2017/0302736 A1* | 10/2017 | Hudda | | G06Q 30/0207 |
| 2017/0310500 A1* | 10/2017 | Dawes | | H04L 67/60 |
| 2017/0317997 A1* | 11/2017 | Smith | | H04L 9/14 |
| 2017/0318074 A1* | 11/2017 | Margatan | | G06Q 30/0241 |
| 2017/0322933 A1* | 11/2017 | Rosenblatt | | G06F 16/178 |
| 2017/0323022 A1* | 11/2017 | Miranda | | G06F 16/838 |
| 2017/0329569 A1* | 11/2017 | Wilczynski | | G06F 3/1454 |
| 2017/0331870 A1* | 11/2017 | Giger | | H04L 67/02 |
| 2017/0337247 A1* | 11/2017 | Tague | | G06F 16/248 |
| 2017/0338951 A1* | 11/2017 | Fu | | H04L 9/0894 |
| 2017/0339164 A1* | 11/2017 | Oberheide | | H04L 63/18 |
| 2017/0339221 A1* | 11/2017 | Wang | | H04L 67/02 |
| 2017/0339566 A1* | 11/2017 | Yasuda | | H04W 84/12 |
| 2017/0346621 A1* | 11/2017 | Schepers | | H04L 9/002 |
| 2017/0353324 A1* | 12/2017 | Baum | | H04L 67/125 |
| 2017/0364596 A1* | 12/2017 | Wu | | G06Q 50/01 |
| 2017/0366356 A1* | 12/2017 | Ramos | | H04L 9/0861 |
| 2017/0366568 A1* | 12/2017 | Narasimhan | | G06F 17/16 |
| 2017/0372289 A1* | 12/2017 | Fitzsimmons | | G07G 1/0009 |
| 2018/0004377 A1* | 1/2018 | Kitchen | | H04L 67/025 |
| 2018/0018400 A1* | 1/2018 | Cozzi | | G06F 16/958 |
| 2018/0019871 A1* | 1/2018 | Gage | | G06F 21/6209 |
| 2018/0026925 A1* | 1/2018 | Kennedy | | H04W 4/02 715/753 |
| 2018/0032627 A1* | 2/2018 | Margatan | | H04L 67/535 |
| 2018/0034804 A1 | 2/2018 | Steiner | | |
| 2018/0041505 A1* | 2/2018 | Chabanne | | G06F 21/32 |
| 2018/0060589 A1* | 3/2018 | Polak | | H04L 63/123 |
| 2018/0062828 A1* | 3/2018 | Cioranesco | | H04L 9/0618 |
| 2018/0063158 A1* | 3/2018 | Dalton | | H04L 9/0891 |
| 2018/0069710 A1* | 3/2018 | De Langen | | H04L 9/14 |
| 2018/0069851 A1* | 3/2018 | Terao | | G06F 16/381 |
| 2018/0077248 A1* | 3/2018 | Srour | | H04W 4/02 |
| 2018/0081824 A1* | 3/2018 | Bacher | | H04L 9/3271 |
| 2018/0082351 A1* | 3/2018 | Wang | | G06Q 30/0631 |
| 2018/0091296 A1* | 3/2018 | Johnson | | H04L 9/0631 |
| 2018/0101847 A1* | 4/2018 | Pisut, IV | | G06Q 20/40145 |
| 2018/0102906 A1* | 4/2018 | Lindberg | | H04L 63/0853 |
| 2018/0107684 A1* | 4/2018 | Kiapour | | G06F 16/583 |
| 2018/0121369 A1* | 5/2018 | Poeppelmann | | G06F 12/1408 |
| 2018/0124159 A1* | 5/2018 | Sun | | G06Q 30/0201 |
| 2018/0129826 A1* | 5/2018 | Kim | | H04L 9/14 |
| 2018/0137480 A1* | 5/2018 | Houghton, IV | | G06F 1/1698 |
| 2018/0145840 A1* | 5/2018 | Advani | | H04L 12/1831 |
| 2018/0145953 A1* | 5/2018 | Swahn | | G06F 21/606 |
| 2018/0150568 A1* | 5/2018 | Hochreuter | | G06F 16/9535 |
| 2018/0152305 A1* | 5/2018 | Jacquin | | H04L 9/3263 |
| 2018/0164986 A1* | 6/2018 | Al Majid | | G06T 7/11 |
| 2018/0182048 A1* | 6/2018 | Stöcker | | G06Q 50/06 |
| 2018/0183765 A1* | 6/2018 | Neumann | | H04L 63/0428 |
| 2018/0191720 A1* | 7/2018 | Dawes | | H04L 69/08 |
| 2018/0198621 A1 | 7/2018 | Senyuk et al. | | |
| 2018/0198788 A1* | 7/2018 | Helen | | H04L 12/2827 |
| 2018/0199386 A1* | 7/2018 | Yuan | | H04W 4/70 |
| 2018/0206279 A1* | 7/2018 | Lee | | H04W 76/14 |
| 2018/0219674 A1* | 8/2018 | Mullins | | H04L 9/0861 |
| 2018/0227128 A1* | 8/2018 | Church | | H04L 9/3247 |
| 2018/0234494 A1* | 8/2018 | Klemets | | H04L 67/1068 |
| 2018/0242147 A1* | 8/2018 | Fransen | | H04W 76/10 |
| 2018/0247657 A1* | 8/2018 | Marathe | | H04L 65/1016 |
| 2018/0248807 A1* | 8/2018 | Murphy | | H04L 67/53 |
| 2018/0254901 A1* | 9/2018 | Egorov | | H04L 9/0822 |
| 2018/0254970 A1* | 9/2018 | Gullen | | H04L 67/75 |
| 2018/0255068 A1* | 9/2018 | Figueroa | | H04L 67/563 |
| 2018/0278588 A1* | 9/2018 | Cela | | H04L 63/18 |
| 2018/0287785 A1* | 10/2018 | Pfannenschmidt | | H04L 9/14 |
| 2018/0287801 A1* | 10/2018 | Donlan | | G06F 21/78 |
| 2018/0302468 A1* | 10/2018 | Hu | | H04L 67/565 |
| 2018/0315350 A1* | 11/2018 | Rietman | | H04L 9/004 |
| 2018/0316634 A1* | 11/2018 | Driscoll | | H04L 51/04 |
| 2018/0323970 A1* | 11/2018 | Maron | | H04L 9/0891 |
| 2018/0330368 A1* | 11/2018 | Slupesky | | H04L 67/02 |
| 2018/0332122 A1* | 11/2018 | Shahid | | G06F 9/543 |
| 2018/0338008 A1* | 11/2018 | Trinite | | H04L 63/0428 |
| 2018/0350180 A1* | 12/2018 | Onischuk | | G07C 13/00 |
| 2018/0367311 A1* | 12/2018 | Stahlberg | | H04L 9/3234 |
| 2019/0020469 A1* | 1/2019 | Dottax | | H04W 12/069 |
| 2019/0034907 A1* | 1/2019 | Powers | | G07G 1/01 |
| 2019/0050589 A1* | 2/2019 | Rane | | H04L 9/008 |
| 2019/0068382 A1* | 2/2019 | Theodore | | H04W 12/06 |
| 2019/0090252 A1* | 3/2019 | Park | | H04L 67/141 |
| 2019/0104121 A1* | 4/2019 | Khandani | | H04L 9/0891 |
| 2019/0109714 A1* | 4/2019 | Clark | | H04L 67/565 |
| 2019/0122443 A1* | 4/2019 | Stöcker | | G06T 19/006 |
| 2019/0124134 A1* | 4/2019 | Chmielewski | | H04L 12/2809 |
| 2019/0141535 A1* | 5/2019 | Morgan | | H04L 65/1069 |
| 2019/0147170 A1* | 5/2019 | Keselman | | G06F 21/602 713/189 |
| 2019/0149332 A1* | 5/2019 | Rivain | | H04L 9/0822 713/168 |
| 2019/0156055 A1* | 5/2019 | Rosenberg | | G16H 10/20 |
| 2019/0156212 A1* | 5/2019 | Bottaro | | G06F 16/951 |
| 2019/0158293 A1* | 5/2019 | Chen | | G06Q 20/382 |
| 2019/0158304 A1* | 5/2019 | Sundermeyer | | H04L 12/2818 |
| 2019/0182335 A1* | 6/2019 | Chen | | H04L 67/141 |
| 2019/0213356 A1* | 7/2019 | Vágujhelyi | | G06F 21/6254 |
| 2019/0229912 A1* | 7/2019 | Lee | | H04L 63/1466 |
| 2019/0230092 A1* | 7/2019 | Patel | | G06F 16/907 |
| 2019/0237170 A1* | 8/2019 | Okajima | | G06F 21/6209 |
| 2019/0245686 A1* | 8/2019 | Rahimi | | G06F 21/72 |
| 2019/0250805 A1* | 8/2019 | Brewer | | G06F 3/04847 |
| 2019/0250944 A1* | 8/2019 | Pounds | | H04L 67/561 |
| 2019/0260584 A1* | 8/2019 | Chan | | G06F 21/75 |
| 2019/0268156 A1* | 8/2019 | Delmas | | G06F 21/31 |
| 2019/0268165 A1* | 8/2019 | Monica | | H04L 63/10 |
| 2019/0289042 A1* | 9/2019 | Perreault | | H04L 67/148 |
| 2019/0312750 A1* | 10/2019 | Bertram | | G06F 13/4063 |
| 2019/0318356 A1* | 10/2019 | Martin | | H04L 9/0637 |
| 2019/0319904 A1* | 10/2019 | Al Majid | | H04L 51/10 |
| 2019/0320038 A1* | 10/2019 | Walsh | | H04L 67/567 |
| 2019/0334884 A1* | 10/2019 | Ross | | G06F 21/41 |
| 2019/0340001 A1* | 11/2019 | Vysotsky | | H04L 67/561 |
| 2019/0342425 A1* | 11/2019 | Cheng | | H04L 41/0895 |
| 2019/0347916 A1* | 11/2019 | Wild | | H04L 67/1095 |

(56) References Cited

U.S. PATENT DOCUMENTS

| | | | |
|---|---|---|---|
| 2019/0356491 A1* | 11/2019 | Herder, III | H04L 9/3242 |
| 2019/0361642 A1* | 11/2019 | Shibata | H04L 9/14 |
| 2019/0372760 A1* | 12/2019 | Zheng | H04L 9/085 |
| 2019/0372961 A1* | 12/2019 | Circosta | H04L 12/2814 |
| 2019/0379675 A1* | 12/2019 | Johns | H04L 67/146 |
| 2019/0379744 A1* | 12/2019 | Johns | H04L 63/168 |
| 2020/0004679 A1* | 1/2020 | Szubbocsev | G06F 12/1408 |
| 2020/0005257 A1* | 1/2020 | Liberty | G06F 9/546 |
| 2020/0007332 A1* | 1/2020 | Girkar | H04L 9/3213 |
| 2020/0012801 A1* | 1/2020 | Porteret | H04W 12/68 |
| 2020/0015081 A1* | 1/2020 | Porteret | H04L 9/30 |
| 2020/0021481 A1* | 1/2020 | Tsigkogiannis | H04L 65/1101 |
| 2020/0042746 A1* | 2/2020 | Avanzi | H04L 9/088 |
| 2020/0044833 A1* | 2/2020 | Shpurov | G06F 21/6218 |
| 2020/0053079 A1* | 2/2020 | Bendersky | H04L 9/14 |
| 2020/0053163 A1* | 2/2020 | Ngo | H04L 63/029 |
| 2020/0074121 A1* | 3/2020 | Fu | G06F 21/33 |
| 2020/0074122 A1* | 3/2020 | Fu | G06F 21/602 |
| 2020/0076624 A1* | 3/2020 | Cambou | H04L 9/0643 |
| 2020/0082462 A1* | 3/2020 | Nguyen | G06Q 30/0609 |
| 2020/0084050 A1* | 3/2020 | Mensch | H04L 9/3263 |
| 2020/0117814 A1* | 4/2020 | Ito | G06F 21/79 |
| 2020/0118234 A1* | 4/2020 | Venkataraman | G06Q 50/265 |
| 2020/0119911 A1* | 4/2020 | Shemer | H04L 9/30 |
| 2020/0125563 A1* | 4/2020 | Fan | H04L 9/0894 |
| 2020/0127813 A1* | 4/2020 | Millar | G06Q 20/363 |
| 2020/0137354 A1* | 4/2020 | Nathan | G06V 20/52 |
| 2020/0139141 A1* | 5/2020 | Crawford | G06F 21/6245 |
| 2020/0195525 A1* | 6/2020 | Fitzer | H04L 41/5048 |
| 2020/0196299 A1* | 6/2020 | Liu | H04W 52/0219 |
| 2020/0201760 A1* | 6/2020 | Desai | H04L 67/02 |
| 2020/0202036 A1* | 6/2020 | Baruch | H04L 63/101 |
| 2020/0204357 A1* | 6/2020 | Seyfried | H04L 9/3215 |
| 2020/0218586 A1* | 7/2020 | Aghadavoodi Jolfaei | H04L 67/02 |
| 2020/0228520 A1* | 7/2020 | Thampi | H04W 4/80 |
| 2020/0250323 A1* | 8/2020 | Remington | G06F 21/71 |
| 2020/0252288 A1* | 8/2020 | Al-Yousef | H04L 63/101 |
| 2020/0259642 A1* | 8/2020 | McCallum | H04L 9/088 |
| 2020/0259644 A1* | 8/2020 | McCallum | H04L 9/0872 |
| 2020/0259645 A1* | 8/2020 | McCallum | H04L 9/0872 |
| 2020/0301752 A1* | 9/2020 | Mara | H04L 67/104 |
| 2020/0313895 A1* | 10/2020 | Ha | H04L 9/0643 |
| 2020/0322306 A1* | 10/2020 | Serena | H04L 67/535 |
| 2020/0366674 A1* | 11/2020 | Gazdzinski | G07B 17/00314 |
| 2020/0374113 A1* | 11/2020 | Noam | H04L 9/0637 |
| 2020/0389302 A1* | 12/2020 | Canard | H04L 9/3226 |
| 2020/0389304 A1* | 12/2020 | Gryb | H04L 9/085 |
| 2020/0401627 A1* | 12/2020 | Liu | G06N 3/08 |
| 2020/0401718 A1* | 12/2020 | Hennig | G06F 21/6281 |
| 2020/0403784 A1* | 12/2020 | Rodriguez | G06F 21/74 |
| 2021/0005302 A1* | 1/2021 | McFarlane | G16H 40/20 |
| 2021/0014058 A1* | 1/2021 | Finchelstein | G06F 21/82 |
| 2021/0014302 A1* | 1/2021 | Robison | H04L 67/1029 |
| 2021/0036851 A1* | 2/2021 | Villapakkam | G06F 21/602 |
| 2021/0036856 A1* | 2/2021 | Wang | H04L 9/0894 |
| 2021/0045169 A1* | 2/2021 | Pupakdee | H04W 12/50 |
| 2021/0050996 A1* | 2/2021 | Fries | H04L 9/0894 |
| 2021/0051377 A1* | 2/2021 | Deshpande | H04N 21/632 |
| 2021/0058245 A1* | 2/2021 | Bursell | H04L 9/0894 |
| 2021/0058379 A1* | 2/2021 | Bursell | H04L 63/0435 |
| 2021/0058493 A1* | 2/2021 | Huang | H04L 63/08 |
| 2021/0084027 A1* | 3/2021 | Johnston | H04L 9/50 |
| 2021/0090011 A1* | 3/2021 | Rae | G06F 16/955 |
| 2021/0092113 A1* | 3/2021 | Manikantan | H04L 63/0853 |
| 2021/0126879 A1* | 4/2021 | Liu | H04L 51/046 |
| 2021/0160340 A1* | 5/2021 | Narayanan | H04L 67/53 |
| 2021/0176049 A1* | 6/2021 | Kwak | G06F 21/602 |
| 2021/0226781 A1* | 7/2021 | Arkko | H04L 9/085 |
| 2021/0234681 A1* | 7/2021 | Buendgen | H04L 9/0897 |
| 2021/0310222 A1* | 10/2021 | Melul | H04W 4/029 |
| 2021/0320790 A1* | 10/2021 | Nishimura | H04L 9/0897 |
| 2021/0320792 A1* | 10/2021 | Cech | H04L 9/0894 |
| 2021/0351919 A1* | 11/2021 | Liu | G06F 21/73 |
| 2021/0407322 A1* | 12/2021 | Ilani | G06F 7/722 |
| 2021/0407323 A1* | 12/2021 | Ilani | G06F 7/722 |
| 2022/0004613 A1* | 1/2022 | Dange | G06K 7/1417 |
| 2022/0004619 A1* | 1/2022 | Dange | G06F 21/45 |
| 2022/0021633 A1* | 1/2022 | Stafford | H04W 4/12 |
| 2022/0038264 A1* | 2/2022 | Yakira | H04L 9/3026 |
| 2022/0038870 A1* | 2/2022 | Stafford | H04W 4/14 |
| 2022/0038995 A1* | 2/2022 | Athlur | H04W 12/033 |
| 2022/0138349 A1* | 5/2022 | Saarinen | G06F 9/30029 713/192 |
| 2022/0247579 A1* | 8/2022 | Bester | H04L 9/0894 |
| 2022/0318080 A1* | 10/2022 | Henry | G06F 9/541 |
| 2022/0360445 A1* | 11/2022 | Kwak | H04L 9/0897 |
| 2022/0376933 A1* | 11/2022 | Guabtni | H04L 67/06 |
| 2023/0012013 A1* | 1/2023 | Livshin | H04L 9/3252 |
| 2023/0068521 A1* | 3/2023 | Wang | G06F 21/602 |
| 2023/0133418 A1* | 5/2023 | Dietrich | H04L 63/0853 713/156 |
| 2023/0171309 A1* | 6/2023 | Bhatt | G06Q 10/02 709/219 |
| 2023/0188341 A1* | 6/2023 | Ying | H04L 9/0891 713/193 |
| 2023/0188485 A1* | 6/2023 | Stafford | H04L 51/046 |
| 2023/0196347 A1* | 6/2023 | Tate | G06Q 20/3827 705/75 |
| 2023/0254292 A1* | 8/2023 | Chen | H04L 63/123 713/168 |
| 2023/0269080 A1* | 8/2023 | Wirth | H04L 9/0838 380/28 |
| 2023/0282083 A1* | 9/2023 | Cornell | G08B 29/186 348/152 |
| 2023/0290177 A1* | 9/2023 | Jacobs | G06F 16/51 |
| 2024/0022418 A1* | 1/2024 | Hawkins | H04L 9/14 |
| 2024/0097900 A1* | 3/2024 | Teglia | G06F 7/726 |
| 2024/0154949 A1* | 5/2024 | Frosztega | H04L 9/3234 |
| 2024/0223354 A1* | 7/2024 | Azouaoui | H04L 9/3218 |
| 2025/0004952 A1* | 1/2025 | Ahirwar | G06F 21/78 |
| 2025/0068779 A1* | 2/2025 | Ramani | G06F 21/85 |

FOREIGN PATENT DOCUMENTS

| | | | | |
|---|---|---|---|---|
| EP | 2690838 A1 * | 1/2014 | | G06F 21/34 |
| WO | WO 01/22651 A2 | 3/2001 | | |
| WO | WO-2007038283 A2 * | 4/2007 | | G06F 17/30861 |
| WO | WO 2016/112338 A1 | 7/2016 | | |
| WO | WO 2019/129941 A1 | 7/2019 | | |

OTHER PUBLICATIONS

Panton et al "Secure Proximity-Based Identity Pairing using an Untrusted Signalling Service," 2016 IEEE 13th IEEE Annual Consumer Communications & Networking Conference (CCNC), pp. 1-6 (Year: 2016).*

Google Patents Translation of CN 108768938 (Year: 2018).*

Panton et al "Secure Proximity-Based Identity Pairing using an Untrusted Signalling Service," 2016 13th IEEE Annual Consumer Communications & Networking Conference, IEEE, pp. 1-6 (Year: 2016).*

Liu et al "Techniques of Secure Web Service and Its Implementation," Proceedings of the Fourth International Conference on Machine Learning and Cybernetics, IEEE, pp. 161-164 (Year: 2005).*

Ramya et al "Review on Quick Response Codes in the Field of Information Security," pp. 1-5 (Year: 2014).*

Khedekar "Security: An Effective Technique to Protecting Sensitive Information using Quick Response Code," IEEE, pp. 1185-1188 (Year: 2016).*

Australian Patent Office International-Type Search Report for National Application No. 2019903591, dated Dec. 9, 2019, 20 pgs.

International Search Report for corresponding International Patent Application No. PCT/AU2020/051020, dated Oct. 13, 2020, 8 pgs.

Written Opinion of the International Searching Authority for corresponding International Patent Application No. PCT/AU2020/051020, 4 pgs.

(56) References Cited

OTHER PUBLICATIONS

Extended European Search Report for corresponding European patent application No. 20868522.2, dated Aug. 31, 2023, 11 pgs.

\* cited by examiner

CRYPTOGRAPHIC SERVICES FOR BROWSER APPLICATIONS

CROSS-REFERENCE TO RELATED APPLICATIONS

The present application is the U.S. National Stage application of PCT Application No. PCT/AU2020/051020 filed Sep. 25, 2020, designating the United States, which claims priority to Australian Provisional Patent Application No. 2019903591 filed Sep. 25, 2019, the contents of which are each incorporated herein by reference in their entirety.

TECHNICAL FIELD

Aspects of this disclosure relate generally to the provision of cryptographic services to web browsers and more specifically to systems and methods for providing cryptographic services to a browser by a cryptographic device.

BACKGROUND

Many webpages now facilitate or require the use of cryptographic functions to provide authentication, encryption and other security features to users.

For example, two step (or two factor) authentication is a method of authenticating a user by utilising a secret that the user knows, such as a password, and a cryptographic secret that the user can generate through use of a cryptographic device and can provide to the webpage. This form of authentication is becoming more prevalent in line with the increased demand for enhanced security.

Additionally, many web enabled applications now provide functionality that enables a user to apply encryption and decryption to data for privacy purposes, or to interface with cryptographic applications such as blockchain ledgers.

Unfortunately, users often find the use of cryptographic services provided by web pages to be cumbersome and inefficient to use. Furthermore, an increased risk of unintentional or malicious security breaches means that there is a focus on ensuring that such cryptographic services be highly resistant to hacking or tampering by malicious parties.

Accordingly, there is a need for a private, secure and convenient means of providing authentication and cryptography services to web enabled applications, such as browsers.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

There is provided a method for obtaining cryptographic services for a browser executing a webpage. The method comprises establishing a persistent peer-to-peer connection over a wireless Internet Protocol communication network between the browser and a cryptographic device, in response to receiving user input to the webpage, transmitting, by the browser, data indicated by the user input over the persistent peer-to-peer connection to the cryptographic device, for cryptographic processing of the data by the cryptographic device using a cryptographic key stored on the cryptographic device to produce a cryptographic result, and receiving, by the browser, the cryptographic result over the persistent peer-to-peer connection from the cryptographic device, and providing the cryptographic result to the webpage.

The method may further comprise the steps of receiving, by the cryptographic device, from the browser, data via the persistent peer-to-peer connection between the browser and the cryptographic device, performing, by the cryptographic device, the cryptographic function on the data using the cryptographic key stored on the cryptographic device, to produce the cryptographic result, and transmitting, by the cryptographic device, the cryptographic result to the browser, over the persistent peer-to-peer connection.

The persistent peer-to-peer connection may remain established over multiple iterations of the steps of transmitting, by the browser, the data over the persistent peer-to-peer connection to the cryptographic device, and receiving, by the browser, the cryptographic result over the persistent peer-to-peer connection from the cryptographic device.

The cryptographic device may send confidential data stored on the cryptographic device, from the cryptographic device to the browser. Furthermore, the cryptographic device may sign, encrypt, verify or decrypt the data with the cryptographic key to produce the cryptographic result.

The browser may embed the cryptographic result in the webpage. Additionally, the browser may provide the cryptographic result to a server hosting the webpage, which may result in the browser receiving an updated webpage from the server hosting the webpage.

A persistent peer-to-peer connection may be established via the browser signalling information. The cryptographic device may receive the signalling information, and in response, transmit response information, to the browser, necessary to establish a peer-to-peer connection. The signalling information may be signalled 'out of band', for example via a Quick Response (QR) code displayed within the browser.

The signalling information may include an authentication challenge, which may be signed by the cryptographic device by applying an authentication key to the challenge information to produce a challenge response.

The cryptographic device may transmit a signalling response back to the browser, which include cryptographic device identification information and the challenge response. The response may also include a public key which is complementary to the private key stored on the cryptographic device.

The software describing the browser's establishment and management of the peer-to-peer connection may be injected into the webpage by the browser. The software may be described by JavaScript libraries which are invoked by a call to the libraries embedded in the webpage code.

According to another aspect of the disclosure, there is provided a method of obtaining cryptographic services for a browser executing a webpage on a user device, the method comprising establishing a persistent peer-to-peer connection between the browser and a cryptographic device, in response to receiving user input to the webpage, transmitting, by the browser, data indicated by the user input over the persistent peer-to-peer connection to the cryptographic device, applying, by the cryptographic device, a cryptographic function to the data using a cryptographic key stored on the cryptographic device, to produce a cryptographic result; and transmitting, by the cryptographic device, the cryptographic result to the browser, over the persistent peer-to-peer connection.

According to another aspect of the disclosure, there is provided a method of providing cryptographic services to a browser executing a webpage, the method comprising receiving data from the browser, via a persistent peer-to-peer connection between the browser and a cryptographic device, performing, by the cryptographic device, a cryptographic function on the data using a cryptographic key stored on the cryptographic device, to produce a cryptographic result, and transmitting, by the cryptographic device, the cryptographic result to the browser, over the persistent peer-to-peer connection.

According to another aspect of the disclosure, there is provided a browser executing a webpage on a user device, the browser configured to, establish a persistent peer-to-peer connection between the browser and a cryptographic device, in response to receiving a user input to the webpage, transmit data indicated by the user input over the persistent peer-to-peer connection to the cryptographic device for cryptographic processing of the data using a cryptographic key stored on the cryptographic device, to produce a cryptographic result, and receive the cryptographic result over the persistent peer-to-peer connection from the cryptographic device.

According to another aspect of the disclosure, there is provided a cryptographic device configured to establish a persistent peer-to-peer connection between a browser executing a webpage, and an cryptographic application executing on the cryptographic device, receive data from the browser, via the persistent peer-to-peer connection, perform a cryptographic function on the received data, using a cryptographic key stored on the cryptographic device, to produce an cryptographic result, transmit the cryptographic result to the browser, via the persistent peer-to-peer connection.

BRIEF DESCRIPTION OF DRAWINGS

Examples will now be described with reference to the following drawings, in which.

DESCRIPTION OF EMBODIMENTS

Network Overview

Figure 1:
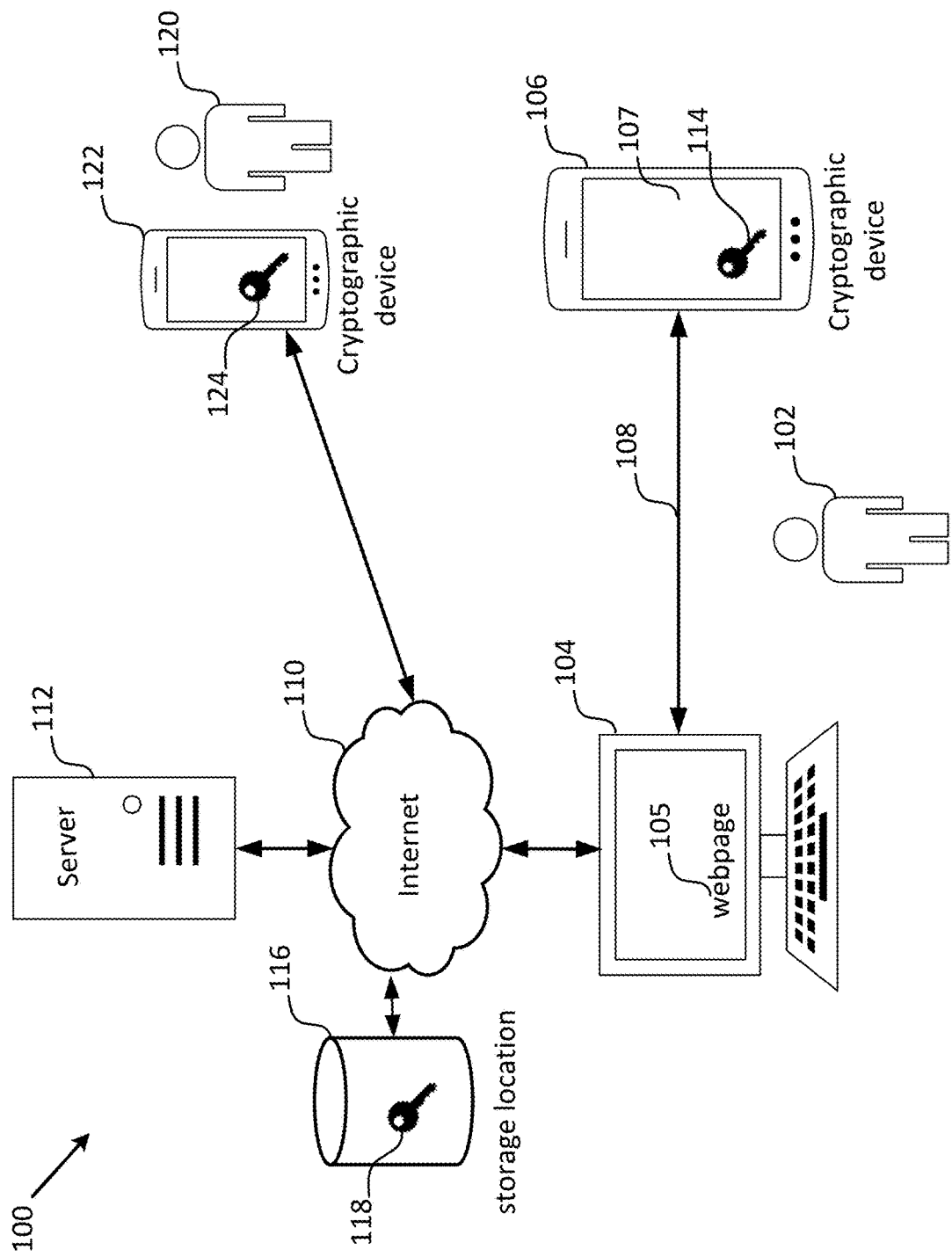
FIG. 1 illustrates a network diagram.

FIG. 1 illustrates a network diagram 100 in accordance with an aspect of this disclosure. A user 102 is in operation of a device, exemplified by a personal computer 104, displaying a webpage within a web browser 105 executing on the personal computer 104. It is to be understood that in other examples, the browser may be executing on a mobile phone, or other suitable web enabled device.

The user 102 is also in operation of a cryptographic device 106, exemplified by a mobile phone. The mobile phone includes software and hardware configured to perform cryptographic functions using one or more cryptographic keys 114 stored on the cryptographic device 106.

It is to be understood that the description of the cryptographic device as a mobile phone is not intended to be limiting. A cryptographic device in accordance with this disclosure could be a device which is specifically dedicated to providing cryptographic processing services and providing cryptographic results over a peer-to-peer connection, a full function device such as a personal computer, a headless device without a screen and interface, or any device which is capable of performing the functionality as attributed to the cryptographic device herein.

Instead of having to establish a connection with the browser each time a cryptographic service is required, the web browser 105 executing on the personal computer 104 is persistently in communication with the mobile phone via a persistent peer-to-peer connection 108. The web browser 105 is also in communication with a web server 112 via an internet connection 110, such that the web browser is able to download and display webpages from web server 112 via internet connection 110.

In cases where authentication of the user is required, one or more public keys 118 associated with the user 102 may be stored in memory storage 116 which is accessible by the web server 112. The memory storage 116 may be located within web server 112 or remote from web server 112, as depicted in FIG. 1.

Another party 120 is also illustrated. The other party may be another user or application. The other party 120 is in operation of a cryptographic device 122, which in the example shown in FIG. 1 is a mobile phone. The other party may be a communication partner of the user 102, with which the communication partner has exchange public keys via the Public Key Infrastructure, or the like. If the other party is a communication partner of the user 102, one or more public keys 124 associated with the user 102 may be stored on the other party's device 122. A role of the other party 120 will be described in subsequent sections.

Cryptographic Device

Figure 2:
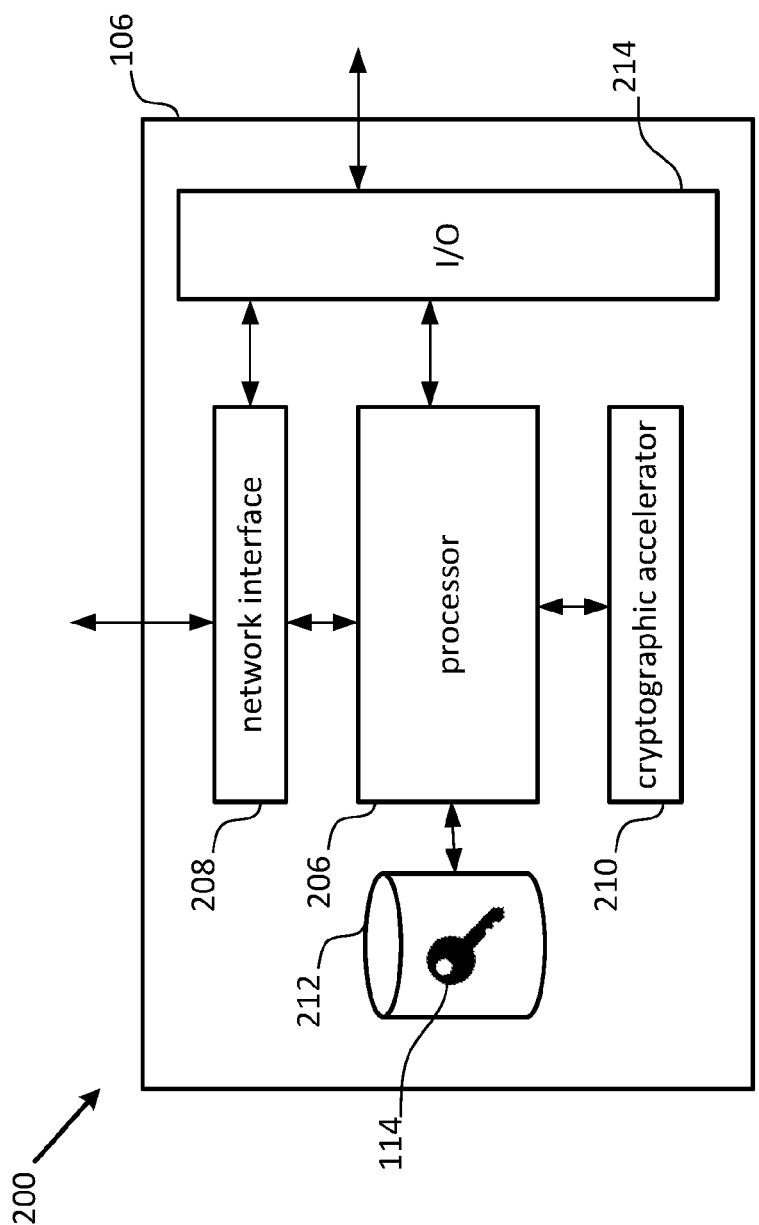
FIG. 2 is block diagram of the cryptographic device of FIG. 1.

FIG. 2 is a block diagram of the cryptographic device 106 of FIG. 1. The cryptographic device 106 comprises a processor configured to control operation of the device through the execution of a cryptographic application stored, at least in part, on memory storage 212. Memory storage 212 also stores identification information associated with the one or more user identities of the user 102. The identification information may include user names, email addresses, user identification numbers, and the like.

Additionally, memory storage 212 stores one or more cryptographic keys 114 to be used by the cryptographic application in the provision of cryptographic services to the browser 105 and in the authentication of the user's identify, if this is required.

The memory storage 212 may comprise a plurality of individual or interconnected memory storage components. Furthermore, the memory storage 212 may comprise components internal to the cryptographic device, and/or may comprise separate components which are in communication with the cryptographic device, or may comprise a combination thereof.

The device 106 further comprises a network interface 208. According to the embodiment illustrated in FIG. 2, the network interface 208 is a wireless internet interface, which is configured to receive and transmit information wirelessly to and from the internet.

The device 106 further comprises one or more input/output interfaces 214. The I/O interface may comprise: a camera, configured to capture images and provide said images to the processor; a user input in the form of a touch screen, number pad or keyboard; and an output in the form of a display screen or a status light. Other input/output interfaces may be provided which enable the user to provide and receive information to the device.

The processor of the cryptographic device executes a cryptographic application, which controls the provision of cryptographic processing services and manages the establishment and operation of the peer-to-peer connection.

The cryptographic device 106 may include a cryptographic hardware accelerator 210 which is configured to perform cryptographic processing, such as encryption, decryption and signing in hardware. The inclusion of a cryptographic hardware accelerator may be desirable to improve the performance or the security of the cryptographic device.

The cryptographic processing services may be provided by the cryptographic application executing on the processor, or by the hardware accelerator, or by a combination thereof. The cryptographic device may be configured to provide asymmetric cryptography, such as RSA or others, and may also be configured to provide symmetric cryptography.

Cryptographic Keys

The cryptographic keys stored within memory storage 212 may include one or more keys which are used to provide cryptographic services to the browser. The type of keys stored on the device will depend upon the type of cryptographic services provided by the device. The cryptographic device may perform asymmetrical or symmetrical cryptography, or a combination of the two.

Asymmetric cryptography uses public and private keys to encrypt and decrypt data. The public key may be shared with other parties; however, the private key remains secure and unknown to other parties. In contrast, symmetric cryptography uses only a single key to apply and remove a cryptographic function on data.

Where the device 106 provides asymmetric cryptographic processing, the cryptographic device may generate a public/private key pair. Alternatively, the cryptographic keys may be pre-configured during manufacture or setup of the cryptographic device. The public key may be stored in memory storage 212 and communicated to communication parties as required. In contrast, private keys will not be communicated external to the device, and will be stored in memory storage 212. The cryptographic device may also store public keys received from communication partners.

As noted above, memory storage 212 may comprise a plurality of different memory components. For enhanced security, private keys may be stored in a memory component which is resistant to malicious access by an external party.

Since the cryptographic device performs cryptographic processing for the browser, advantageously, the private key remains stored on the device, and there is no need to communicate the private key outside the device 106. Accordingly, there is no need to entrust the user's private key with another party, such as a web server. As the private key is not stored by another party, there is no concern that the private key will be disclosed unintentionally by the other party, or discovered through a security breach of the other party.

The cryptographic keys stored in memory storage 212 may also include one or more keys used to authenticate the identity of the user. A key used to authenticate the identity of the user may be a private key which is associated with a corresponding public key, in the case that asymmetric cryptography is used during authentication. Although enhanced security would result from an authentication key differing from the one or more cryptographic keys used to provide cryptographic services to the browser, it is envisaged that, for some implementations, a cryptographic device may use the same cryptographic key for the provision of cryptographic services to the browser and for the authentication of the user's identity.

Communication Parties

As illustrated in FIG. 1, a communication partner 120 of a user may exist. A communication partner is another user to which the user 102 has provided a public key 124 corresponding to the user's private key (one of 114). The communication partner may also have provided the user 102 with a public key associated with a private key of the communication partner. Through use of the user's public key 124, the communication partner 120 can provide cryptographically processed information, such as digital signatures and encrypted information, to the user 102. Furthermore, though the user's use of the communication partner's public key, the communication partner can verify the authenticity of data signed by the communication partner's public key, or decrypt data encrypted by the communication partner's public key.

Multiple User Identities

In some situations, it may be desirable for the cryptographic device to be configured to maintain a plurality of identities for the user (or set of users) of the device. Situations in which this may be advantageous include where the user operates both a personal and business identity, or where the user has an administrator role in addition to their user role. Alternatively, or additionally, the user may elect to maintain a plurality of identities and private keys for security or privacy purposes.

To accommodate a plurality of identities, the cryptographic device may be configured to store a plurality of cryptographic keys within the memory store 212, so that each user identity may be associated with a unique cryptographic key for enhanced security. The user of the device may select one of the plurality of user identities when establishing a persistent peer-to-peer connection with a browser. Additionally, it is to be understood that a cryptographic device may establish a plurality of separate persistent peer-to-peer connections between one or more browsers, whereby each of the separate connections may be associated with a different user identity.

Configuration Process

An exemplary mechanism for configuring the cryptographic device and the browser to perform methods in accordance with this disclosure, will now be described. However, it will be appreciated that there are numerous mechanisms and variations via which the cryptographic device and the browser may be configured to perform methods in accordance with this disclosure.

The user 102 downloads a cryptographic application 107 from an application server to cryptographic device 106 and installs the cryptographic application. The application server may be the same entity as web server 112. The user 102 triggers the execution of the cryptographic application and creates a user account, for an identity of the user, by providing identifying information such as a user name and authentication information such as a password, phrase or other secret information known to the user. This identifying information and authentication information is provided by the cryptographic application to the server 112 for storage. It is noted, however, that persistent storage of the identifying and authentication information on server 112 is not essential and the keys maybe the only data stored in cryptographic device 106.

If two-factor authentication is desired, the cryptographic application may also generate a private/public key pair to be associated with the user identity for authentication purposes, storing the private key in the memory storage 212, and providing the public key to the server 112, or a storage location 116 accessible by the server 112. Accordingly, it will be possible for the server who has access to the public key, to verify the identity of the user by applying the public key to a digital signature that the user has signed with their private key.

The user 102 uses the browser to download a webpage 105 of a website from the web server 112. The user may log into the website 105 using the same user identification information used to create an account for the cryptographic application. Accordingly, the user may be logged into both the website and the cryptographic application on the cryptographic device; however this is not essential.

The user may now take steps to establish a persistent peer-to-peer connection between the browser and the cryptographic device, so that the cryptographic device may provide cryptographic services to the browser.

Persistent Peer-to-Peer Connections

A persistent peer-to peer connection provides a communication channel between two internet connected applications, e.g. a browser 105 and a cryptographic application 107 executing on a cryptographic device.

Communication across the persistent peer-to-peer connection may be achieved via various communication protocols. One peer-to-peer communication protocol which may be applied in accordance with aspects of this disclosure is the Web Real-Time Communication (WebRTC) application programming interface (API). WebRTC provides web browsers and other internet connected applications with real-time communications via simple APIs, including the RTCPeerConnection API, which provides a mechanism for establishing a peer-to-peer connection, and the RTCDataChannel API, which provides a mechanism to transmit arbitrary data over the peer-to-peer connection.

Accordingly, a peer-to-peer connection, allows peer devices to communicate bit streams, files, audio or video communications and other data forms, by providing a direct communication channel between peers, over the Internet Protocol. This eliminates the need for a dedicated server to relay communications from a transmitting peer to a receiving peer.

Signalling

To establish a peer-to-peer connection between one internet connected application and another internet connected application, to the participants perform a signalling process, whereby identifying and locating information is exchanged between the peer applications. Signalling allows the applications to exchange metadata to coordinate communication.

Exemplary information communicated during the signalling process includes network data, which reveals where the applications are located on the internet (IP address and port) so that each application can locate the other. Other information that may be communicated during the signalling process includes session control information which determines when to initialise, close and modify the peer-to-peer connection; and configuration data, which indicates the functional range of the applications, and what type of data can be communicated across the connection. Additionally, signalling may include an authentication and authorisation mechanism to verify the identity of the user.

Signalling Methods

One method of implementing a peer-to-peer connection is to provide signalling information via a server; however, there are situations in which it may be undesirable to use a server to facilitate the signalling process due to limited server bandwidth, speed or privacy concerns. Accordingly, it may be desirable to provide a signalling mechanism that does not necessitate the use of a server, to establish a peer-to-peer connection.

Signalling information may be sent from a first peer to a second peer 'out of band', meaning that the signalling information is transmitted via a communication means that is not the channel over which the peer-to-peer connection will be established. One method for transmitting the signalling information 'out of band' is to provide the signalling information as a QR code which can be displayed on a display of the initiating peer device. A responding peer can then receive the signalling information by capturing the QR code using a camera input.

An initiating peer may transmit signalling information to a responding peer through other 'out of band' mechanisms including, but not limited to, SMS, email, Near Field Communications, Bluetooth, hardwired connection, manual input or via USB.

Embodiment—Establishing a Persistent Peer-to-Peer-Connection

A method of establishing a persistent peer-to-peer connection between a browser and a cryptographic device, using a QR code to transmit the signalling information, will be described with reference to FIG. 3, which illustrates a method 300 as performed by a browser 105, and FIG. 4, which illustrates a complementary method 400 as performed by a cryptographic application 107 executing on a cryptographic device, in the form of a mobile phone 106. The exemplary methods illustrated in FIGS. 3 and 4 use the WebRTC protocol to establish the persistent peer-to-peer connection.

In step 302, the user authenticates themselves to the webpage executing within the browser, by entering a username and password to log into the webpage. Alternatively, some other means of user authentication may be utilised. In some situations, step 302 may not be required, as the cryptographic device may provide user identification during the establishment of the persistent peer-to-peer connection.

At step 302, it may also be appropriate for the user or the browser to configure parameters pertaining to the type of cryptographic services that are desired.

In step 304, in response to receiving an input trigger from the user, such a mouse click on a webpage button or URL, the browser displays a QR code which encodes signalling information to initiate the establishment of a persistent peer-to-peer connection between the browser 105 and the cryptographic device 106. The signalling information includes the public-facing IP address of the browser, as well as the port and transport protocol to be used for the persistent peer-to-peer connection. The signalling information may also include additional information, such as information which identifies the webpage.

Signalling Via QR Code

The mobile phone scans 404 the QR code using the phone's camera. The image of the QR code is then provided to a cryptographic application executing on the phone. In step 406, the cryptographic application decodes the QR code to extract the signalling information.

Authentication Challenge

In some applications, it may be desirable to authenticate, during establishment of the persistent peer-to-peer connection, that the cryptographic device is appropriately associated with user identity used to log into the browser. In other applications, this authentication process may not be needed or desired; for example, if the webpage allows connections as a guest, or where the user's identity has been otherwise authenticated.

Figure 3:
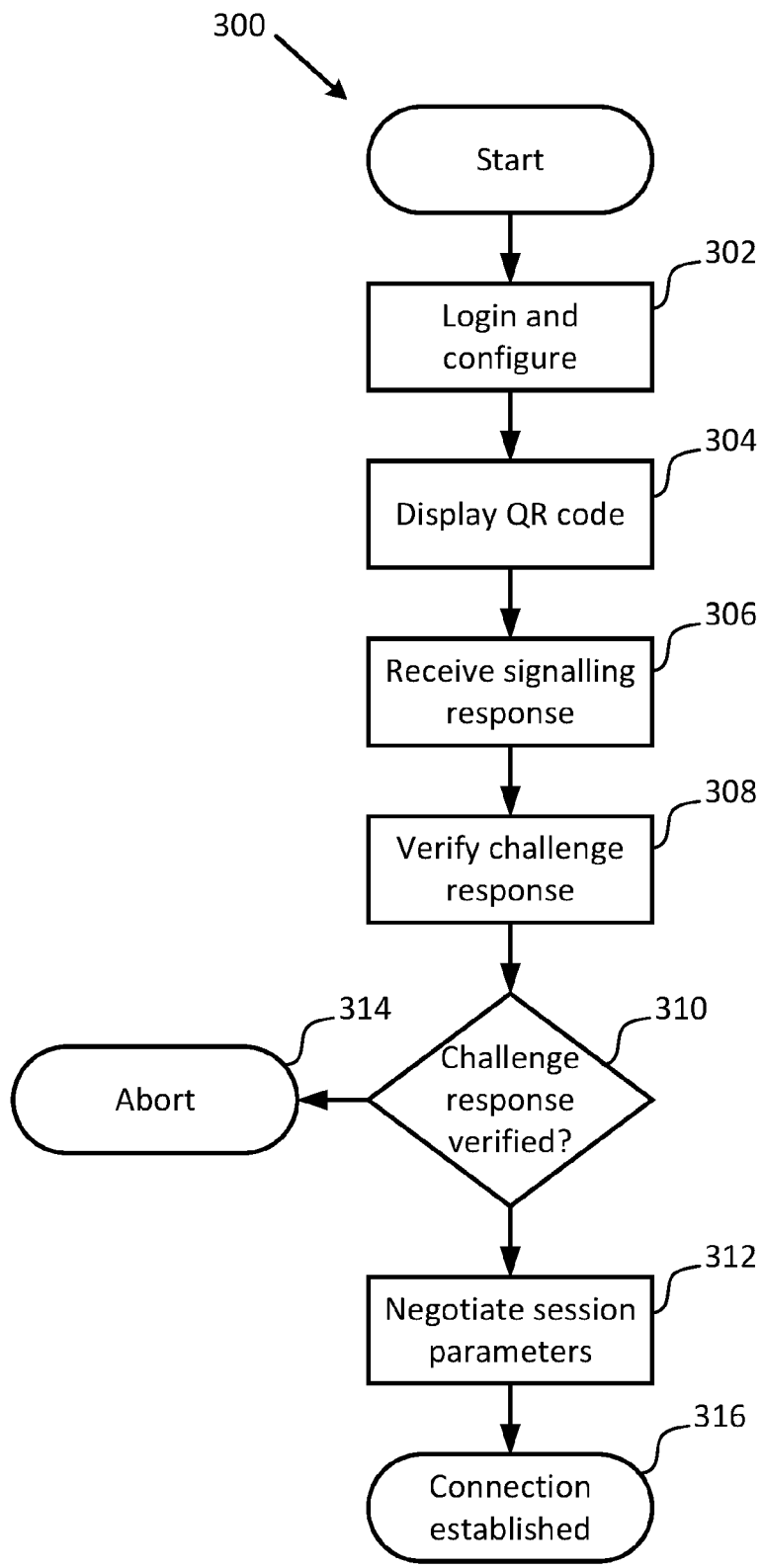
FIG. 3 is a flowchart illustrating a method, as performed by a browser, of establishing a peer-to-peer connection between a browser and a cryptographic device.
Figure 4:
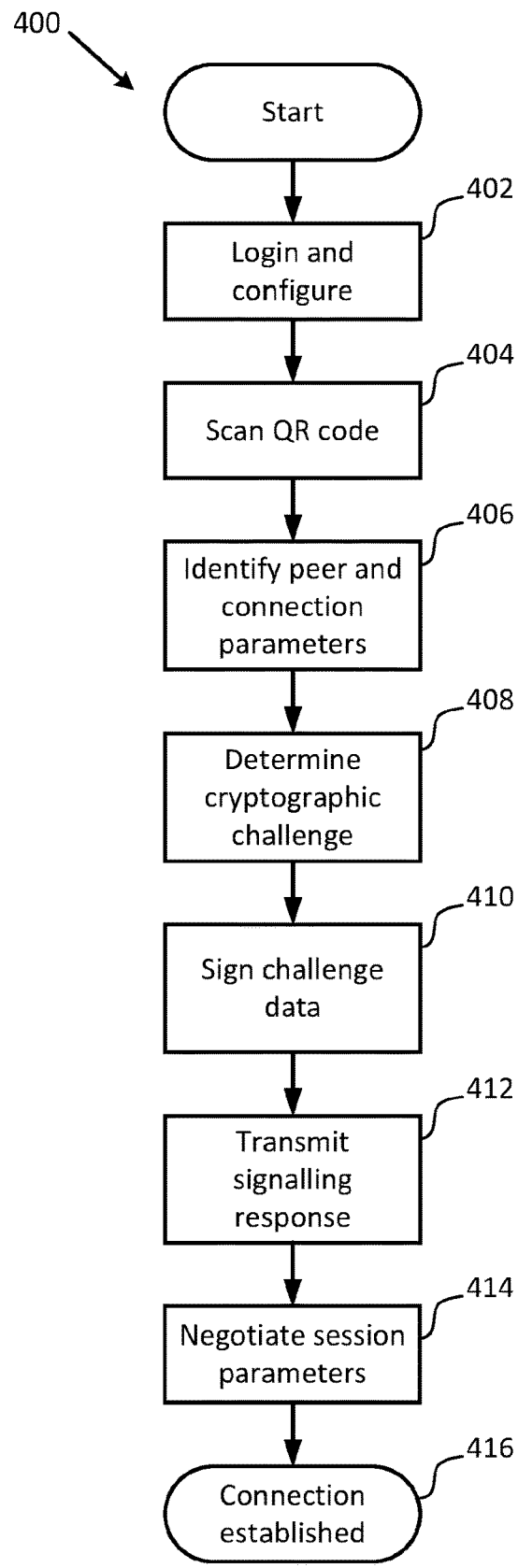
FIG. 4 is a flowchart illustrating a method, as performed by a cryptographic device, of establishing a peer-to-peer connection between a browser and a cryptographic device.

In the embodiment illustrated in FIGS. 3 and 4, the browser requires the authentication of the cryptographic device in relation to the user's logged in identity. Accordingly, the signalling information provided in the QR code, in step 304, also includes authentication challenge data, which will be used to authenticate that the cryptographic device is associated with the user identity used to log in to the browser. The authentication challenge data may be a pseudo-randomly generated bit-string.

In step 408, the cryptographic application determines the authentication challenge data from the QR code, and in step 410, the cryptographic device calculates a signature of the challenge data using an authentication key stored on the cryptographic device, to produce signed authentication challenge data. The authentication key may be the private key of a public/private key pair which identifies the user identity by which the user logged into the cryptographic device and the browser in steps 302 and 402, respectively.

In step 412, the cryptographic application prepares a signalling response message, which includes cryptographic device identification information, such as an IP address and a port of the cryptographic device. The cryptographic device identification information may also include a list of cryptographic services supported by the device. The signalling response message also includes the signed authentication challenge data.

The cryptographic application then transmits 412 the signalling response message, via the internet, to the browser at the IP address and port specified in the QR code.

In step 306, the browser receives the signalling response message from the cryptographic device. Accordingly, now both the browser and the cryptographic device know the connection details (IP address and port) of the other peer, and therefore a persistent peer-to-peer connection can be established. However, in the exemplary embodiment illustrated in FIGS. 3 and 4, the browser requires authentication of the user's identify before establishment of the persistent peer-to-peer connection.

In step 308, the browser extracts the signed authentication challenge data from the signalling response message received from the cryptographic device, and provides the signed authentication challenge data to the web server 112. Retrieving the public key 118 associated with the user identity with which the user logged into the web page, the web server 112 verifies that the authentication challenge data has been signed with the user's private key, by considering the challenge data with the digital signature and the user's public key.

If there is a discrepancy which indicates that the private key used to sign the authentication challenge data is not complementary to the public key associated with the user's logged in identity, then the browser may elect to abort 314 the establishment of the persistent peer-to-peer connection.

Otherwise, the browser considers that the user's identity has been authenticated, and the browser 105 proceeds with negotiating session parameters 312, 414 with the cryptographic device 106 over the persistent peer-to-peer connection 108.

In accordance with the WebRTC API, the Session Description Protocol (SPD) may be used to describe the parameters of the persistent peer-to-peer connection, including the types of media to be exchanged between the browser and the cryptographic device, transport protocols, bandwidth information and other metadata, as desired to be negotiated.

Once the session parameters have been settled, the persistent peer-to-peer connection is established 316, 416 and the provision of cryptographic services to the browser, may begin.

Browser Method

Figure 5:
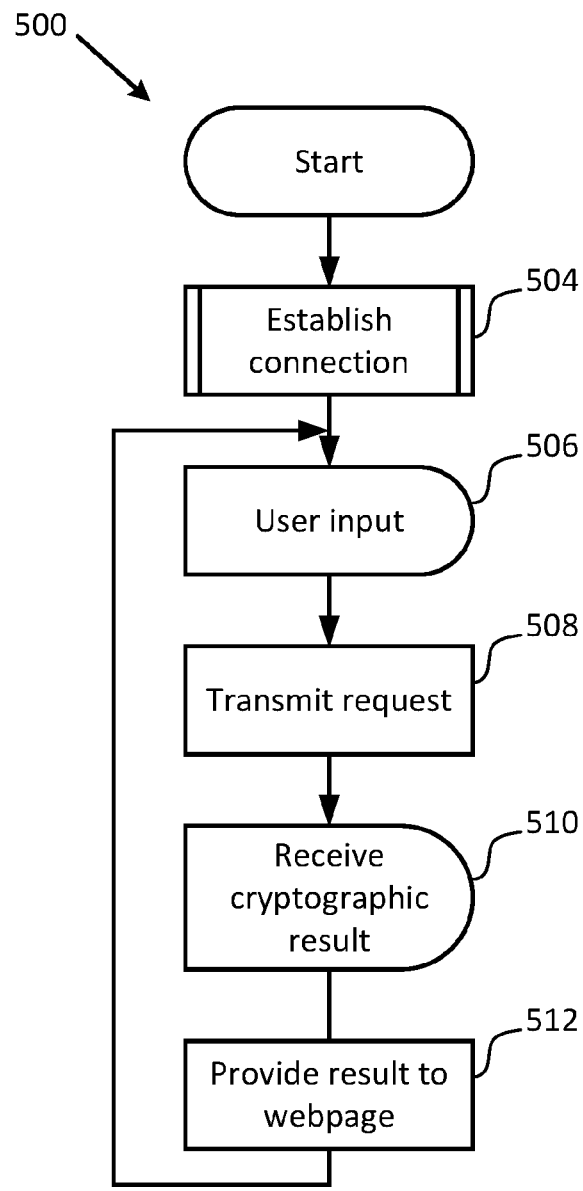
FIG. 5 is a flowchart illustrating a method, as performed by a browser, for obtaining cryptographic services.

FIG. 5 illustrates a method 500 for obtaining cryptographic services for a browser executing a webpage. In step 504, the browser takes steps to establish the persistent peer-to-peer connection with the cryptographic device. The establishment of the persistent peer-to-peer connection may occur in response to the browser receiving user input such as the click of a webpage button, or a URL.

An exemplary method for establishing a persistent peer-to-peer connection has been described in relation to FIGS. 3 and 4; however, alternative methods for establishing a persistent peer-to-peer connection may be utilised. Once the peer-to-peer connection has been established, the browser awaits a user input 506 to indicate that cryptographic processing is requested.

The user input 506 can take a variety of forms. By way of non-limiting examples, the user input 506 may be in the form of a mouse-click on a webpage button or hyperlink, selecting text and right clicking to select a menu option, the use of the browser navigation icons or menu.

In step 508, the browser forms a request message in the form of a data packet which includes including data to be cryptographically processed by the cryptographic device and other information, as required, to specify the parameters of the cryptographic processing. It is envisaged that in some cases, it will not be necessary to specify the parameters of the cryptographic processing, in particular, in situations where the cryptographic device is configured to only provide one processing function, or where the processing function to be performed by the device has already been specified during the establishment of the persistent peer-to-peer connection.

In step 510, the browser waits for and receives a response message from the cryptographic device over the peer-to-peer connection. The response message contains the result of the cryptographic processing of the data by the cryptographic device. In response to receiving this cryptographic result, the browser provides the cryptographic result to the webpage 512. Depending upon the configuration of the webpage, the browser provides the cryptographic result to the webpage via various means, including, but not limited to, updating the webpage to display the cryptographic result, embedding or entering the cryptographic result into the code of the webpage, entering the result into a web form input of the web page, providing the result as an AJAX HTTP request, or a HTML parameter value. Additionally, or alternatively, the browser may provide the cryptographic result to the server 112 hosting the webpage, which may result in the server 112 providing a revised or new webpage to be displayed in the browser 105. Alternatively, the cryptographic result may remain local to the webpage, and not be transmitted to the webserver or other applications.

Following, step 512, the method of the browser returns to step 506 in which the browser waits to receive further input from the user. Notably and advantageously, the peer-to-peer connection is persistent, which means it remains established and open for multiple iterations of steps 506 to 512. Therefore, further requests can be processed with minimal latency, and with less user input.

Device Method

Figure 6:
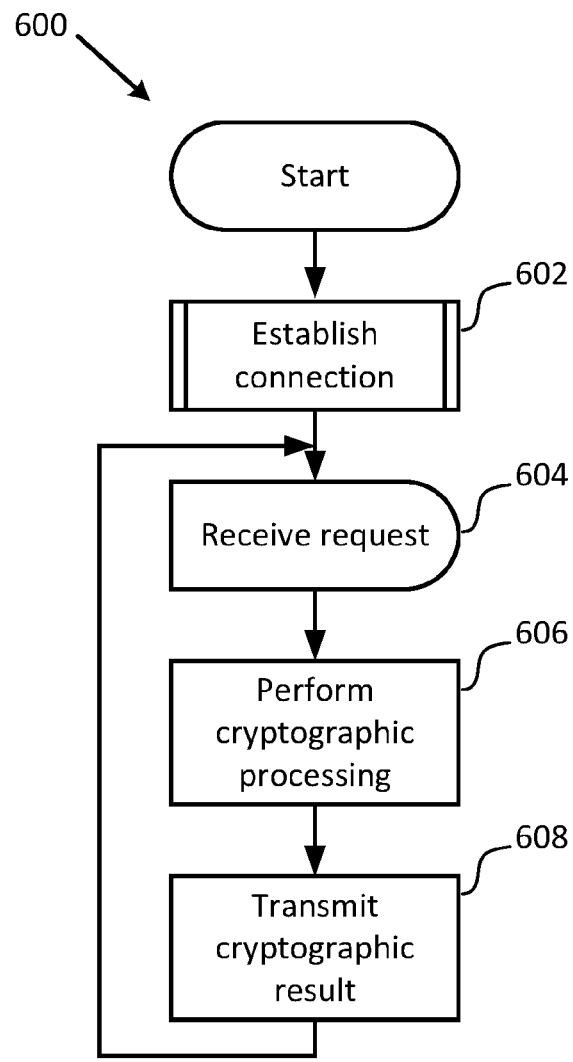
FIG. 6 is a flowchart illustrating a method, as performed by a cryptographic device, for providing cryptographic services.

FIG. 6 illustrates a method 600 performed by the cryptographic device 106, according to one aspect of the present disclosure.

In step 602, the cryptographic device 106 establishes a persistent peer-to-peer connection 108 with the web browser 105. An exemplary method for establishing a persistent peer-to-peer connection has been described in relation to FIGS. 3 and 4; however, alternative methods for establishing connection 108 may be utilised.

In step 604, the cryptographic device 106 waits to receive a request message from the browser 105 over the persistent peer-to-peer connection 108. The request message may be in the form of a data packet containing an indication of the cryptographic function requested to be performed. The data packet may also contain data to which the cryptographic function is to be applied, or an indication of such data, and additional information as required by a particular embodiment. The format and contents of the request message may be configured during the establishment of the peer-to-peer connection, or may be preconfigured into the browser and the cryptographic device.

In step 606, cryptographic device 106 analyses the request message transmitted by the browser over the peer-to-peer connection to determine the cryptographic function to be applied, and the data to which that function should be applied. Depending upon the configuration of the cryptographic device, the device may also seek confirmation from the user to proceed with performing the cryptographic function as requested. The device may seek confirmation by displaying the details of the cryptographic function request on a display of the device, and then wait to receive input from the user to thereby confirm that the cryptographic processing should proceed.

The device 106 then selects an appropriate cryptographic key 114 from the memory storage 212. In embodiments where a plurality of cryptographic keys are stored in memory storage 212, the selection of the appropriate key may depend upon the user identity under which the persistent peer-to-peer connection was established, the type of cryptographic processing requested by the browser, the type of data to be cryptographically processed, or other factors.

The device 106 then performs cryptographic processing 606 on the determined data, using the selected cryptographic key, to produce a cryptographic result. In step 608, the cryptographic result is then packaged by the device into a response message which is transmitted back to the browser via the persistent peer-to-peer connection.

The method of the device then returns to step 604, whereby the device waits for further request messages from the browser to be received over the persistent peer-to-peer connection. Notably and advantageously, the peer-to-peer connection which was established in step 602 is persistent, which means that it remains established through multiple iterations of steps 604, 606 and 608.

Transport Layer Encryption

To ensure transmissions between the browser and the cryptographic device are secure, a transport layer encryption protocol may be applied to messages transmitted over the persistent peer-to-peer connection. An exemplary transport layer encryption protocol is Datagram Transport Layer Security (DTLS), which is designed to protect data privacy and prevent eavesdropping and tampering. It will be appreciated, however, that many other transport layer encryption protocols that are compatible with the Internet Protocol may be used.

Transport layer encryption may be applied to request messages transmitted by the browser to the cryptographic device. Furthermore, transport layer encryption may be applied to response messages transmitted by the cryptographic device to the browser. Accordingly, the cryptographic result embedded in the response message, may be further encrypted due to the application of transport layer encryption.

Persistent Peer-to-Peer Connection

Figure 7:
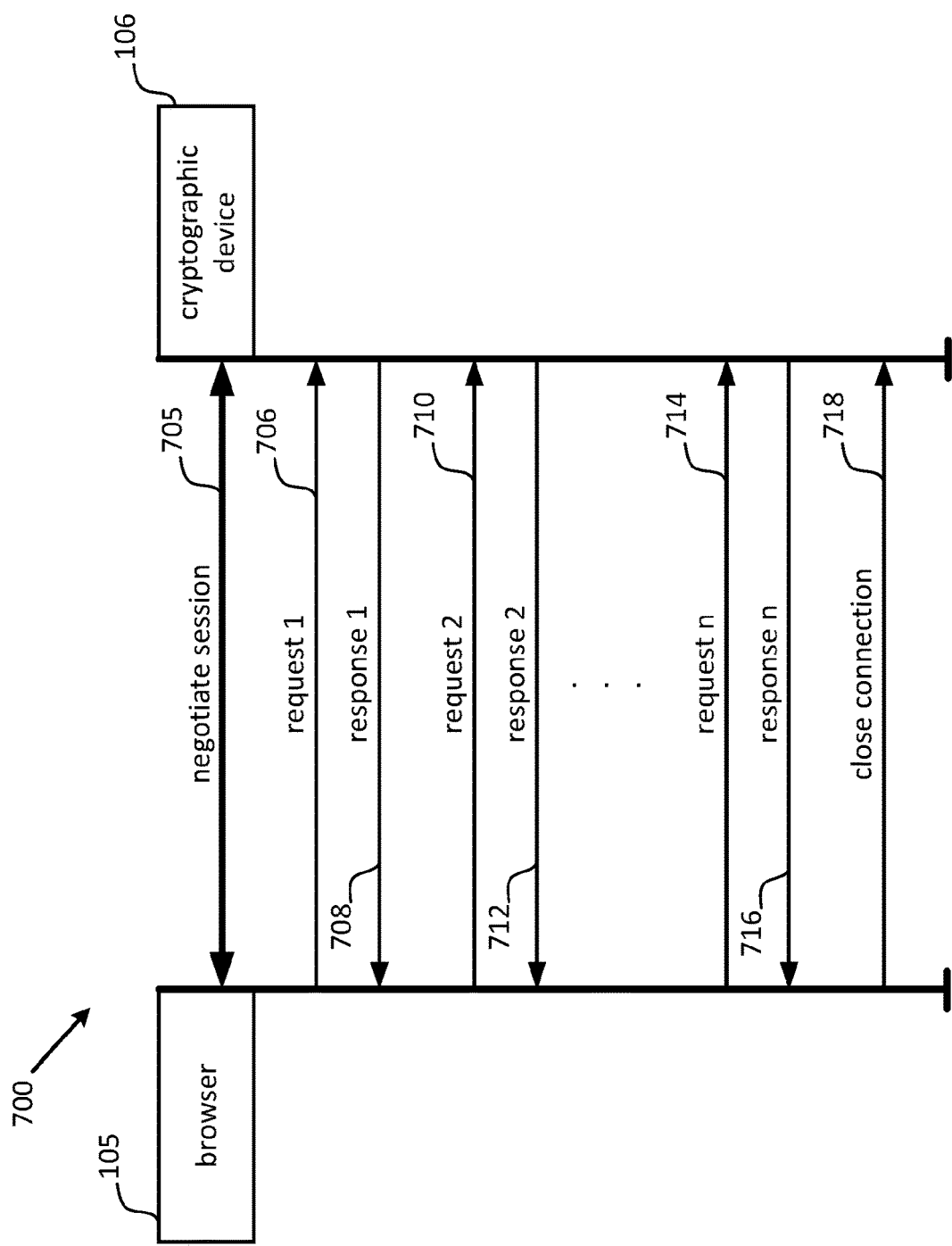
FIG. 7 is a message flow diagram illustrating request and response messages being transmitted between a browser and a cryptographic device.

FIG. 7 is a message flow diagram 700 which illustrates request and response messages being transmitted between the browser 105 and the cryptographic device 106, over an established peer-to-peer connection 108, in accordance with an aspect of this disclosure. At the establishment of the persistent peer-to-peer connection 108, there may be a series of messages 705 transmitted between the browser and the cryptographic device which negotiate the parameters of the communication session.

Messages 706 and 708 are a request and response pair, in which the browser has requested cryptographic processing from the device, and has received a cryptographic response from the cryptographic device Similarly, messages 710 and 712 are another request and response pair, in which the browser has requested further cryptographic processing from the device, and has received a further cryptographic response from the cryptographic device.

Advantageously, multiple request and response pairs may be transmitted over the persistent peer-to-peer connection while established, as illustrated by request and response messages 714 and 716. Advantageously, the browser need not establish a connection each time cryptographic processing is required.

Eventually, the browser may determine that the services of the cryptographic device are no longer required, for example, if the user logs out of the webpage, or takes action to sever the persistent peer-to-peer connection. The browser may then take steps to close the persistent peer-to-peer connection, thus freeing up resources associated with the connection. If the peer-to-peer connection is a WebRTC connection, the connection maybe closed by invoking the RTCPeerConnection.close( ) method, which terminates agents associated with the WebRTC connection. A close message 718 may be transmitted, which triggers the cryptographic device to close the connection, and to cease listening for further request messages via the connection.

It is understood that a peer-to-peer connection may close unexpectedly, due to a fault at the browser or at the cryptographic device, or a network fault. To ameliorate the effect of a closure of the connection, and to enable fast reestablishment of a connection, the browser may store the connection details (e.g. IP address and port) of the cryptographic device so that the connection may be reactivated through the renegotiation of session parameters.

Embodiment—Browser Connecting

An embodiment of the methods as described in FIGS. 5 and 6, will now be illustrated with reference to FIGS. 8a-f.

FIGS. 8a-f illustrates a browser 802 displaying webpages 803a-f. Webpages 803a-f are illustrative of one or more webpages of a website in which users can post messages to a message board. Various forms of message boards exist, including those within social media platforms. Message boards enable users to post content, which is attributed to the user and viewable or accessible by other parties.

The browser task bar 804 is located at the top of the browser and provides navigational control to the user of the browser. Located in the middle of the webpage 803a is a web form element 806a in the form of a text box. The user may enter data into this text box in the usual manner To the right of the webpage 803a, is an interface 808a which indicates whether the browser is connected to a cryptographic device via a persistent peer-to-peer connection. As indicated by the unlocked padlock icon 809, the browser illustrated in FIG. 8 is not currently connected to a cryptographic device via a persistent peer-to-peer connection. A Connect button 810, is provided under the padlock icon 809. A user may click the Connect button 810 to trigger the browser to initiate the establishment of a persistent peer-to-peer connection to a cryptographic device.

Figure 8A:
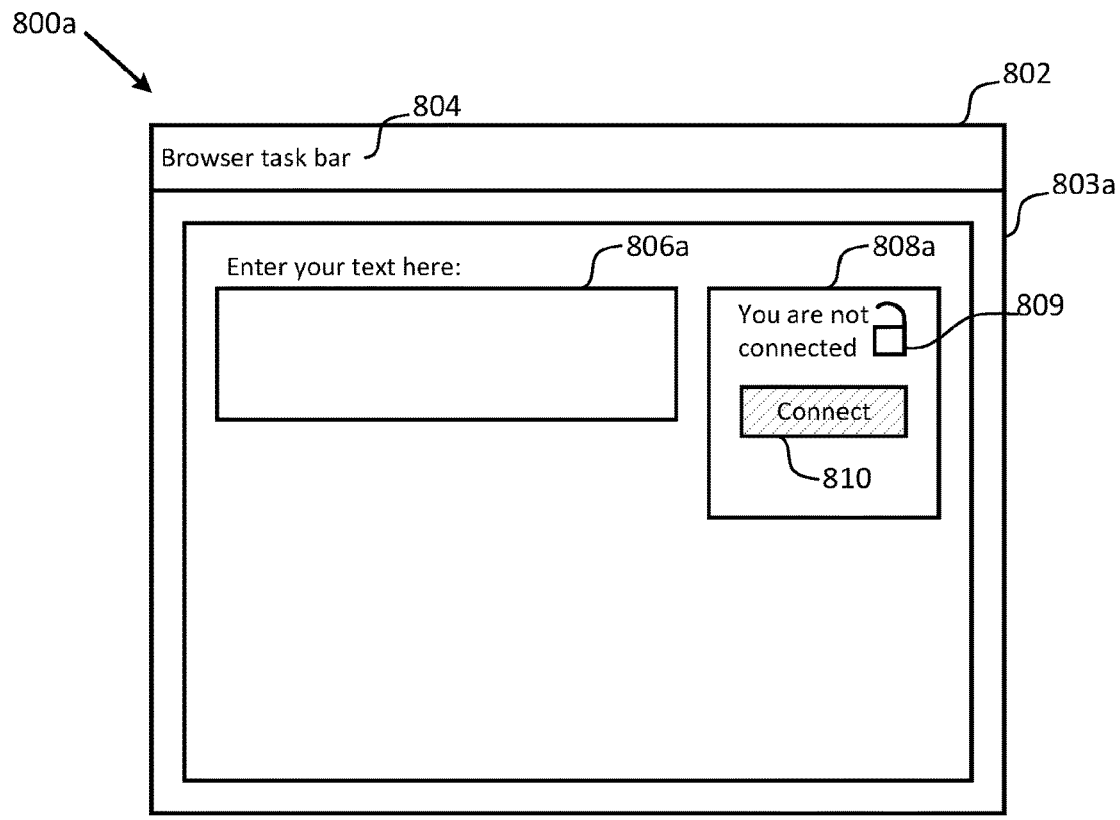
FIGS. 8a-f illustrates a browser displaying webpages.
Figure 8B:
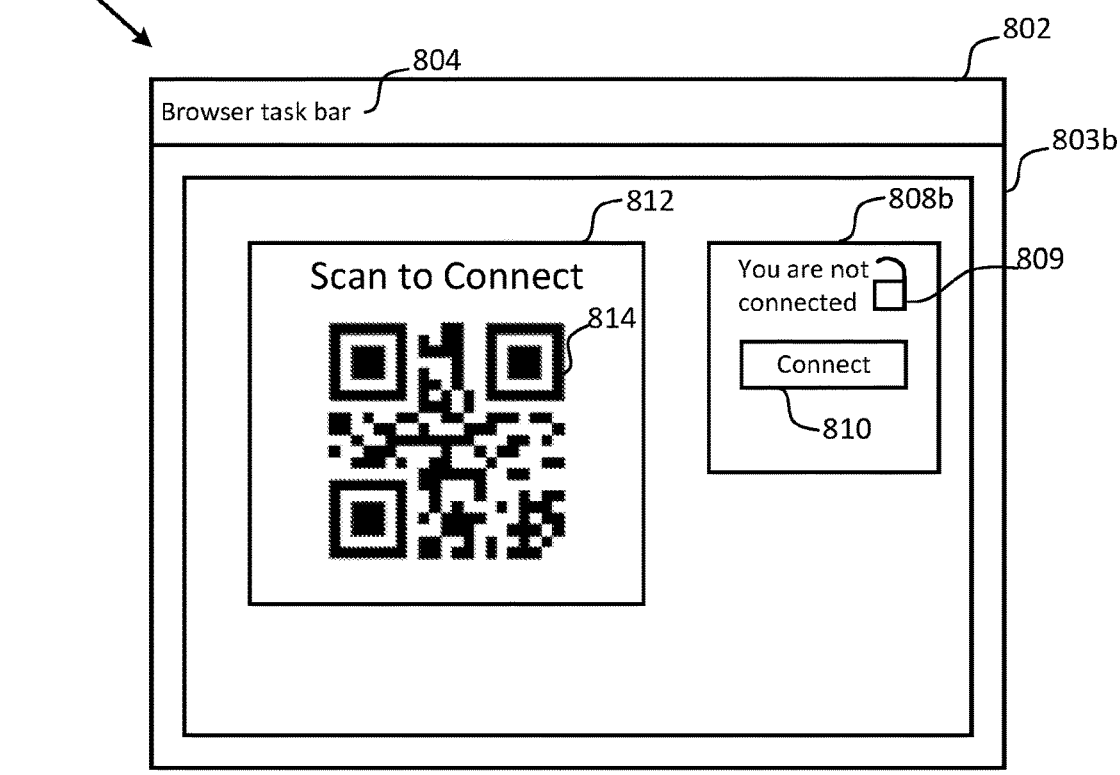

FIG. 8b illustrates the browser 802 displaying a modified version 803b of webpage 803a, as a result of the user clicking the Connect button 810 on webpage 803a. In the example illustrated in FIG. 8b, the browser 802 displays a Scan to Connect box 812 in the middle of webpage 803b. This box contains a QR code 814 which encodes signalling information sufficient to initiate the establishment of a persistent peer-to-peer connection between the browser 802 and a cryptographic device.

The further steps taken by the browser and the cryptographic device to establish the persistent peer-to-peer connection have been described with regards to FIGS. 3 and 4.

Embodiment—Signing

Figure 8C:
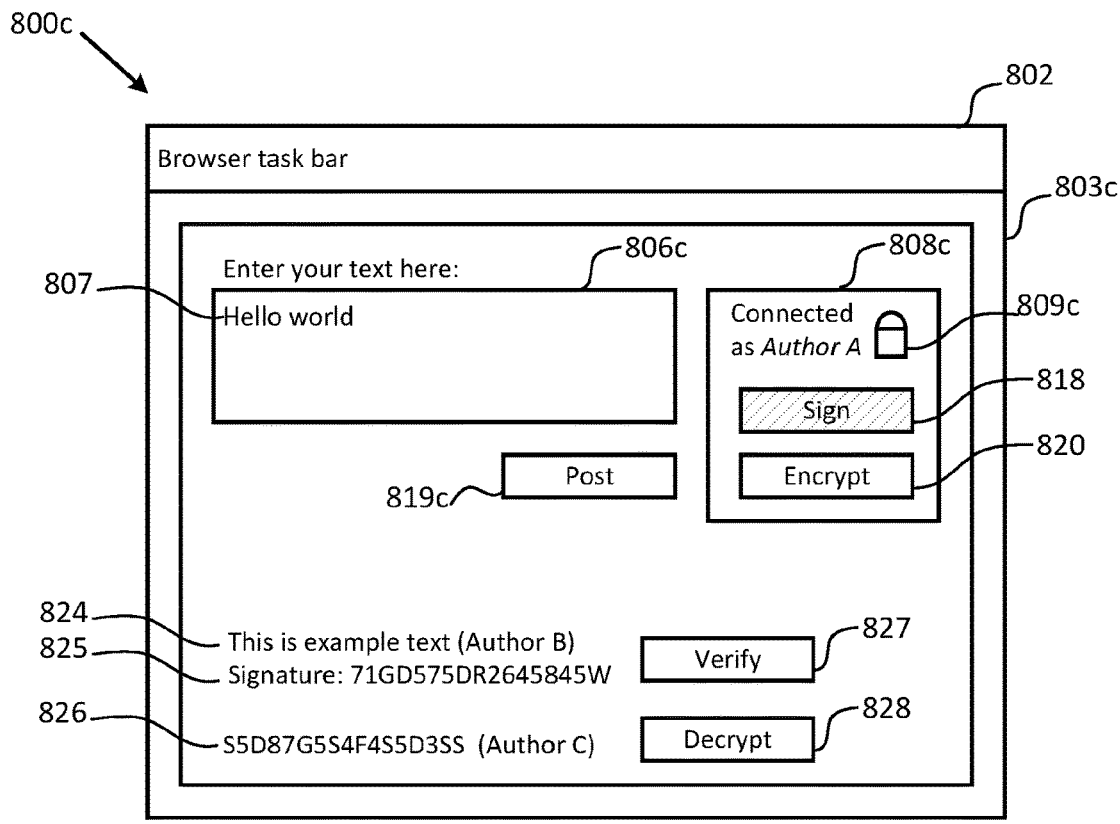

FIG. 8c illustrates the webpage 803c, executing in browser 802, upon establishment of the persistent peer-to-peer connection between the browser 802 and the cryptographic device. The locked padlock icon 809c provides a visual representation to the user that the peer-to-peer connection is currently established.

It can be seen that the user has entered the text "Hello world" 807 into web form element 806c. To post the message directly to the message board, so that other users may see the message, the user may click on the Post button 819c. However, the user may want to provide assurance that the message 807 to be posted to the message board originated from that user, and that the message has not been altered before being posted to the message board. Accordingly, the user may elect to sign the message by calculating a signature over the message contents. To achieve this, the user clicks on the Sign button 818, as indicated by the shading pattern of button 818. In response, the browser packages the user's message 807 into a request for cryptographic processing by signing, and transmits the request to the cryptographic device over the peer-to-peer connection. The cryptographic device applies a digital signature to the user's message 807, for example, by applying a one-way hash of the user's message using a public/private key pair stored in memory storage 212, in accordance with the steps 604 to 608 of FIG. 6, and transmits the digital signature to the browser in a response message.

Figure 8D:
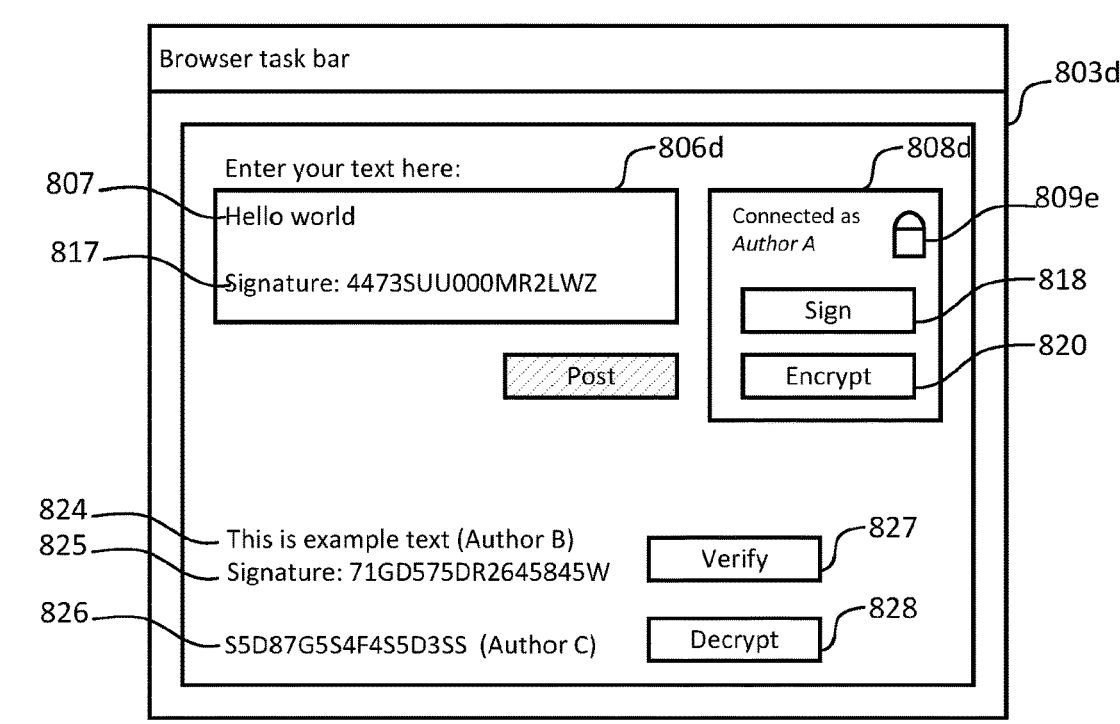

The browser receives the digital signature and, in accordance with the example illustrated in FIG. 8d, provides the signature to the web page. The webpage displays the digital signature 817 below the user's message 807 in the web form element 806d. Alternatively, a browser in accordance with this disclosure, may not display the digital signature within the browser, but may embed the digital signature information within data associated with the webpage. The browser may visually depict that the user's message 807 has been signed through the use of different colouring, shading, location upon the webpage, indicative icons or the like.

It is noted that, the browser may initiate the message signing process upon posting the message, as a matter of course, or as dependent upon the configuration of the webpage or the user. Furthermore, a browser in accordance with this disclosure, may initiate the posting of the user's message 807 upon signing the message, as a matter of course, or as dependent upon the configuration of the webpage or the user.

Figure 8E:
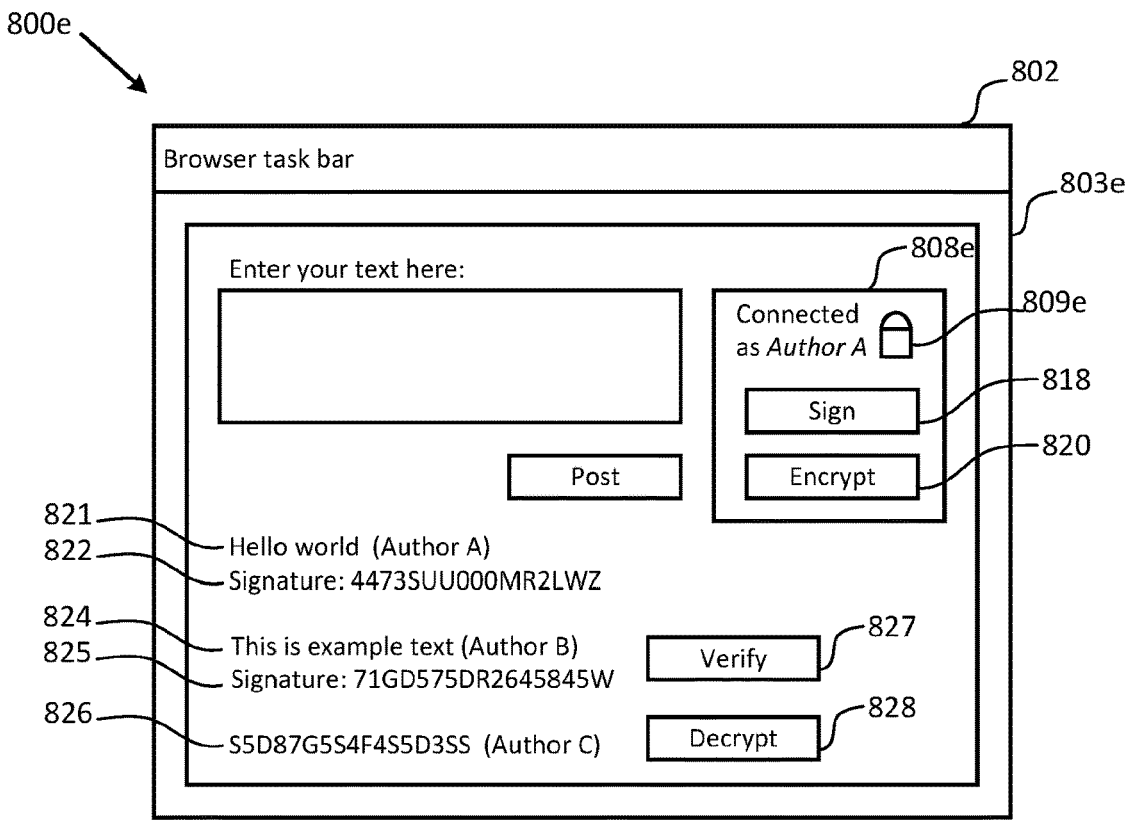

FIG. 8e illustrates the browser 802 with the user's message 821 and its associated signature 822 posted to the message board.

Embodiment—Encrypting

In addition to the option of signing the message, as provided by the Sign button 818, the user has the option of encrypting the message 807 for decryption by communication partner 120. Such message encryption, as performed by Author C, is illustrated in relation to message 826.

To encrypt the message 807, the user clicks on the Encrypt button 820. In response, the browser packages the user's message 807 into a request for cryptographic processing by encryption, and transmits the request to the cryptographic device over the persistent peer-to-peer connection. The cryptographic device encrypts the user's message 807 using the communication partner's public key stored on the cryptographic device, for example in accordance with the steps 604 to 608 of FIG. 6, and transmits the encrypted message to the browser, as a cryptographic result, in a response message.

The browser receives the encrypted message and provides the cryptographic result to the webpage. As exemplified by message 826, the webpage may display the encrypted message in association with the user's identity.

Embodiment—Verifying

FIGS. 8*c-e* also illustrate message verification functionality, according a further aspect of the present disclosure. As indicated by status box 808*c-e* in FIGS. 8*c-e*, a peer-to-peer connection remains established between the browser and a cryptographic device. A Verify button 827 is collocated with a message 824 posted by exemplary author, Author B. Message 824 is also collocated with digital signature 825, which provides prime facia indication that message 824 has been signed by Author B.

A user of browser 802 may use the cryptographic device to verify that the digital signature 825 associated with message 824 has been produced by Author B. In the exemplary scenario as illustrated in FIG. 8*a-e*, the user of browser 802 and the cryptographic device is a communication partner of Author B, and has exchanged public keys with Author B via the Public Key Infrastructure. Accordingly, the cryptographic device 106 stores two keys associated with Author B: a public key to be used when transmitting information to Author B; and a private key to be used when receiving information from Author B. The public key which is complementary to the stored private key has been provided to Author B, and is used by Author B to calculate a signature 825 of message 824.

Accordingly, when the user clicks on the Verify button 827 collocated with message 824 and digital signature 825, the browser forms a request message containing message 824, digital signature 825, information identifying Author B (such as a username), and an indication that the request pertains to a verification function. The browser transmits this request message to the cryptographic device via the established peer-to-peer connection.

Upon receipt of the request message, the cryptographic device determines the private key associated with Author B, and uses the private key to determine whether the digital signature 825 transmitted in the request message, has been produced over message 824 and Author B's private key. The cryptographic device then forms a response message, to be transmitted to the browser over the peer-to-peer connection, including a cryptographic result which either verifies the validity of digital signature 825, or refutes the validity of digital signature 825, in accordance with the cryptographic device's determination.

The browser provides the cryptographic result to the webpage. Depending upon the functionality coded in the webpage, the webpage may indicate a verified signature through a change in colour, shading, collocated icons or otherwise. Similarly, a webpage may indicate a refuted signature by changing the appearance of the message 824 and digital signature 825, or by removal of the same.

Embodiment—Decrypting

FIGS. 8*c-e* also illustrate message decryption functionality, according a further aspect of the present disclosure. As indicated by status box 808*c-e* in FIGS. 8*c-e*, a persistent peer-to-peer connection remains established between the browser and a cryptographic device. A Decrypt button 828 is collocated with a message 826 posted by exemplary author, Author C.

Message 826 has been encrypted using asymmetric encryption prior to posting by Author C, using a public cryptographic key associated with the user. In order for the user of the browser 802 to view the unencrypted contents of message 826, it will be necessary to decrypt message 826 using the user's private cryptographic key.

In the exemplary scenario as illustrated in FIG. 8*c-e*, the user of browser 802 and the cryptographic device is a communication partner of Author C, and has exchanged public keys with Author C via the Public Key Infrastructure. Accordingly, the cryptographic device currently stores a public key associated with Author C, and a private key for communication with Author C. The public key which is complementary to the private key for communication with Author C has been provided to Author C, and is used by Author C to produce encrypted message 826.

Accordingly, when the user clicks on the Decrypt button 828 collocated with encrypted message 826, the browser forms a request message containing encrypted message 826, information identifying Author C (such as a username), and an indication that the request pertains to a decryption function. The browser transmits this request message to the cryptographic device via the established peer-to-peer connection.

Upon receipt of the request message, the cryptographic device retrieves from the memory source 812 a public cryptographic key associated with Author C and suitable to decrypt encrypted message 826. The cryptographic device then decrypts encrypted message 826 by applying the public cryptographic key, and returns the decrypted message, as a cryptographic result, to the browser, in a response message, via the persistent peer-to-peer connection 108.

The browser provides the cryptographic result to the webpage. Depending upon the functionality coded in the webpage, the webpage may display the decrypted message from Author C in place of the encrypted message 826. The cryptographic result may remain local to the webpage, and not transmitted to the webserver or other applications.

Signing, Verifying and Decrypting Files and Other Data

In relation to FIG. 8*a-e*, there has been described methods of signing text based data (i.e. messages posted to a message board), verifying signatures associated with text based data, encrypting and decrypting text based message; however, the above described techniques may also have application in signing, verifying, encrypting and decrypting data other than text messages posted to a message board.

In particular, the methods and devices described herein may be applied to applications such as the signing of documents of certificate, transcripts, medical prescriptions, photographs and any data to which encryption and/or signatures may be applied using a cryptographic key.

Embodiment—Uploading Files

Figure 8F:
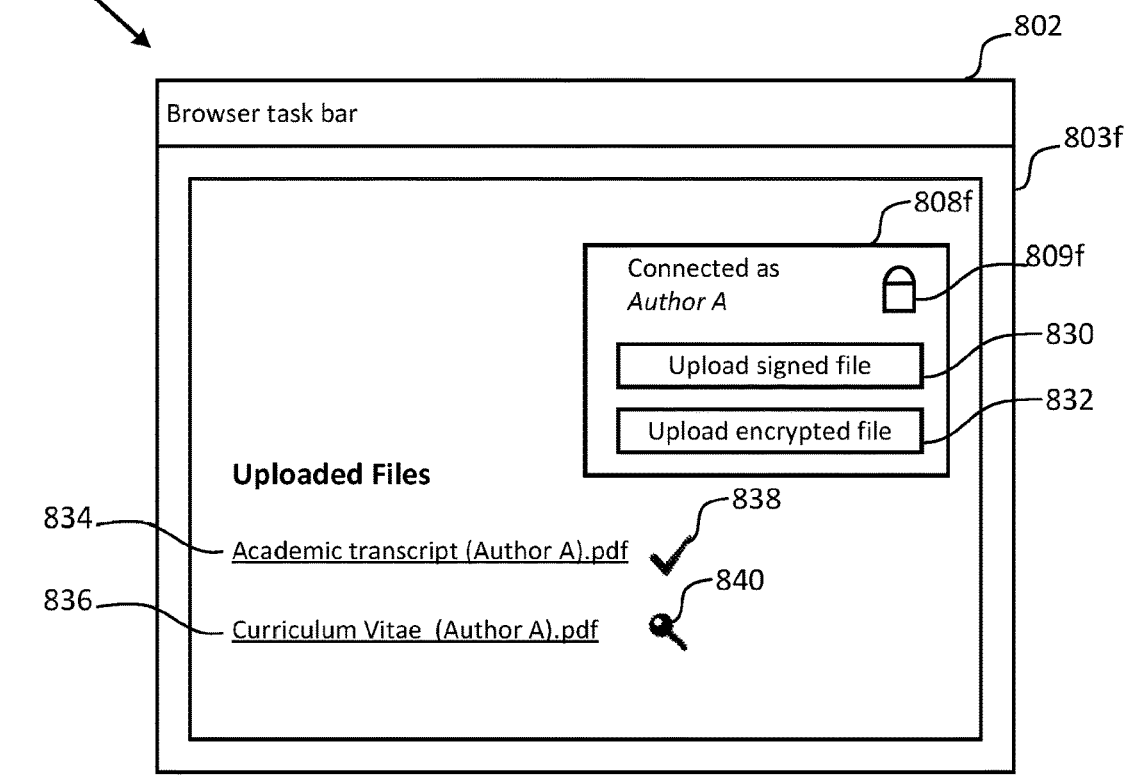

A cryptographic device in accordance with another aspect of the present disclosure, may be configured to transmit confidential information from the cryptographic device to the browser securely. For example, FIG. 8*f* illustrates browser 802 displaying a further version of webpage 803*f*, which enables the uploading of encrypted or signed files. The locked padlock icon 809*f* indicates that a peer-to-peer connection has been established between the browser and a cryptographic device associated with Author A. The "Upload signed file" button 830 provides the user of the browser with the functionality to provide a file signature for a file, whereby the file signature may be verified by the user's communication partner 120. This functionality includes applying a cryptographic key to the file, and uploading the file and its associated signature from the cryptographic device to the browser via the persistent peer-to-peer connection.

To enable this functionality, the following steps may be taken. The user 802, as Author A, selects a file to be uploaded and clicks on the "Upload signed file" button 830. The browser transmits a request message, which includes a file reference and a request for the creation of a file signature, to the cryptographic device 106 via the peer-to-peer connection 108. The cryptographic device 108 locates and retrieves the file from memory source 212, and applies the public key of communication partner 120 to the file contents to calculate a file signature. The cryptographic device transmits the file and its associated signature, as a cryptographic result, to the browser, in a response message, via the peer-to-peer connection.

The browser then provides the cryptographic result to the webpage. Depending upon the configuration of the webpage, the browser may then upload the file and its associated signature to a web server, and may provide an indication of the uploaded file upon the webpage. For example, text 834 indicates the previous upload of a file entitled 'Academic transcript (Author A).pdf'. A file signature has been created by the cryptographic device for this file 834, as indicated by the tick icon 838.

The provision of file signatures with uploaded files enables a communication partner of the uploading user to be able to verify that the file originated from the uploading user, and has not been altered since uploading. The communication partner 120 applies the communication partner's private key to the file to determine whether the associated signature verifies the file.

Furthermore, file encryption functionality can be provided in much the same way as the generation of file signatures as described above. The user 102, as Author A, selects a file to be uploaded and clicks on the "Upload encrypted file" button 832. The browser transmits a request message, which includes a file reference and a request for an encryption of the file, to the cryptographic device 106 via the peer-to-peer connection 108. The cryptographic device 108 locates and retrieves the file from memory source 212, and applies the communication partner's public cryptographic key to the file contents to encrypt the file. The cryptographic device transmits the encrypted file to the browser, as a cryptographic result, in a response message, via the persistent peer-to-peer connection.

The browser provides the cryptographic result to the webpage. Depending upon the configuration of the webpage, the browser may then upload the encrypted file to a web server, and may provide an indication of the uploaded encrypted file upon the webpage. For example, text 836 indicates the previous upload of an encrypted file entitled 'Curriculum Vitae (Author A).pdf'. This file has been encrypted by the cryptographic device, as indicated by the padlock icon 840.

The communication partner 120 may apply the communication partner's private key to the file to decrypt the file.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The invention claimed is:

1. A method for obtaining cryptographic services for a browser executing a webpage on a user device, the method comprising:
    establishing a persistent peer-to-peer connection over a wireless Internet Protocol communication network between the browser and a cryptographic device, the cryptographic device comprising a private authentication key and a cryptographic key stored thereon;
    in response to receiving user input to the webpage, transmitting, by the browser, data indicated by the user input over the persistent peer-to-peer connection to the cryptographic device, for cryptographic processing of the data by the cryptographic device, wherein cryptographic processing comprises applying the cryptographic key to the data to produce a cryptographic result; and
    receiving, by the browser, the cryptographic result over the persistent peer-to-peer connection from the cryptographic device, and providing the cryptographic result to a server hosting the webpage,
    wherein establishing the persistent peer-to-peer connection comprises:
    displaying, by the browser, signalling information including: challenge information and user device identification information;
    receiving, by the browser, response information from the cryptographic device, the response information including:
        a challenge response cryptographically determined by applying the private authentication key to the challenge information, and
        cryptographic device identification information; and
    in response to verifying the challenge response using a public authentication key associated with the private authentication key, establishing the persistent peer-to-peer connection,
    wherein the peer-to-peer connection comprises a communication channel between two internet connected applications,
    wherein the response information indicates the cryptographic device as one of the two internet connected applications, and
    wherein the signalling information is signalled via a communication channel other than the peer-to-peer connection, and the signalling the signalling information comprises displaying a Quick Response (QR) code which encodes the signalling information.

2. The method of claim 1, further comprising:
    receiving, by the cryptographic device, from the browser, data via the persistent peer-to-peer connection between the browser and the cryptographic device;
    performing, by the cryptographic device, the cryptographic function on the data using the cryptographic key stored on the cryptographic device, to produce the cryptographic result; and
    transmitting, by the cryptographic device, the cryptographic result to the browser, over the persistent peer-to-peer connection.

3. The method of claim 1, wherein the persistent peer-to-peer connection remains established over multiple iterations of the steps of:
transmitting, by the browser, the data over the persistent peer-to-peer connection to the cryptographic device; and
receiving, by the browser, the cryptographic result over the persistent peer-to-peer connection from the cryptographic device.

4. The method of claim 1, further comprising sending confidential data stored on the cryptographic device, from the cryptographic device to the browser.

5. The method of claim 1, wherein the cryptographic processing of the data by the cryptographic device comprises signing or encrypting the data with the cryptographic key to produce the cryptographic result.

6. The method of claim 1, wherein the browser embeds the cryptographic result in the webpage.

7. The method of claim 1, wherein the browser receives an updated webpage from the server hosting the webpage, in response to providing the cryptographic result to the server.

8. The method of claim 1, wherein the method further comprises injecting, by the browser, software that defines the method into the webpage.

9. The method of claim 1, wherein the cryptographic device signs the challenge information by applying the private authentication key to the challenge information to produce the challenge response.

10. The method of any claim 1, wherein the data is indicative of data entered by a user of the browser into an input field of the webpage.

11. The method of claim 1, wherein establishing a persistent peer-to-peer connection between the browser and the cryptographic device occurs in response to receiving establishment input from the user of the user device.

12. A system comprising:
at least one processor; and
a non-transitory computer-readable medium storing instructions that, when executed by the at least one processor, cause the system to:
execute, by a browser, a webpage;
establish a persistent peer-to-peer connection over a wireless Internet Protocol communication network between the browser and a cryptographic device, the cryptographic device comprising a private authentication key and a cryptographic key stored thereon;
in response to receiving user input to the webpage, transmit, by the browser, data indicated by the user input over the persistent peer-to-peer connection to the cryptographic device, for cryptographic processing of the data by the cryptographic device, wherein cryptographic processing comprises applying the cryptographic key to the data to produce a cryptographic result; and
receive, by the browser, the cryptographic result over the persistent peer-to-peer connection from the cryptographic device, and providing the cryptographic result to a server hosting the webpage,
wherein to establish the persistent peer-to-peer connection the instructions when executed by the at least one processor further cause the system to:
display, by the browser, signalling information including: challenge information; and user device identification information;
receive, by the browser, response information from the cryptographic device, the response information including:
a challenge response cryptographically determined by applying the private authentication key to the challenge information; and
cryptographic device identification information; and
in response to verification of the challenge response using a public authentication key associated with the private authentication key, establishing the persistent peer-to-peer connection,
wherein the peer-to-peer connection comprises a communication channel between two internet connected applications,
wherein the response information indicates the cryptographic device as one of the two internet connected applications, and wherein the instructions when executed by the at least one processor further cause the system to signal signalling information via a communication channel other than the peer-to-peer connection, and to display a Quick Response (QR) code which encodes the signalling information.

13. The system of claim 12, further comprising the cryptographic device, the cryptographic device configured to:
receive, from the browser, data via the persistent peer-to-peer connection between the browser and the cryptographic device;
perform, the cryptographic function on the data using the cryptographic key stored on the cryptographic device, to produce the cryptographic result; and
transmit the cryptographic result to the browser, over the persistent peer-to-peer connection.

14. The system of claim 13, wherein the instructions, when executed by the at least one processor, further cause the system to send confidential data stored on the cryptographic device, from the cryptographic device to the browser.

15. The system of claim 12, wherein the instructions, when executed by the at least one processor, further cause the persistent peer-to-peer connection to remain established over multiple iterations of:
transmission, by the browser, of the data over the persistent peer-to-peer connection to the cryptographic device; and
reception, by the browser, of the cryptographic result over the persistent peer-to-peer connection from the cryptographic device.

16. The system of claim 12, wherein the instructions, when executed by the at least one processor, further cause the data to be cryptographically processed by the cryptographic device by a signing or an encryption of the data with the cryptographic key to produce the cryptographic result.

17. The system of claim 12, wherein the instructions, when executed by the at least one processor, cause the browser to embed the cryptographic result in the webpage.

18. The system of claim 12, wherein the instructions, when executed by the at least one processor, cause the browser to receive an updated webpage from the server hosting the webpage, in response to providing the cryptographic result to the server.

19. The system of claim 12, wherein the data is indicative of data entered by a user of the browser into an input field of the webpage.

20. A non-transitory computer readable storage medium having stored thereon executable program instructions that, when executed by a computer, cause the computer to perform operations including:
executing, by a browser, a webpage;

establishing a persistent peer-to-peer connection over a wireless Internet Protocol communication network between the browser and a cryptographic device, the cryptographic device comprising a private authentication key and a cryptographic key stored thereon;

in response to receiving user input to the webpage, transmitting, by the browser, data indicated by the user input over the persistent peer-to-peer connection to the cryptographic device, for cryptographic processing of the data by the cryptographic device, wherein cryptographic processing comprises applying the cryptographic key to the data to produce a cryptographic result; and receiving, by the browser, the cryptographic result over the persistent peer-to-peer connection from the cryptographic device, and providing the cryptographic result to a server hosting the webpage, wherein establishing the persistent peer-to-peer connection comprises:
  displaying, by the browser, signalling information including: challenge information; and user device identification information;
  receiving, by the browser, response information from the cryptographic device, the response information including:
    a challenge response cryptographically determined by applying the private authentication key to the challenge information; and
    cryptographic device identification information; and
  in response to verifying the challenge response using a public authentication key associated with the private authentication key,
  establishing the persistent peer-to-peer connection, wherein the peer-to-peer connection comprises a communication channel between two internet connected applications, wherein the response information indicates the cryptographic device as one of the two internet connected applications, and wherein the signalling information is signalled via a communication channel other than the peer-to-peer connection, and the signalling the signalling information comprises displaying a Quick Response (QR) code which encodes the signalling information.

* * * * *